US009395838B2

(12) United States Patent
Yamaguchi

(10) Patent No.: US 9,395,838 B2
(45) Date of Patent: Jul. 19, 2016

(54) INPUT DEVICE, INPUT CONTROL METHOD, AND INPUT CONTROL PROGRAM

(71) Applicant: Panasonic Corporation, Osaka (JP)

(72) Inventor: Takeshi Yamaguchi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 15 days.

(21) Appl. No.: 14/359,168

(22) PCT Filed: Dec. 5, 2012

(86) PCT No.: PCT/JP2012/007801
§ 371 (c)(1),
(2) Date: May 19, 2014

(87) PCT Pub. No.: WO2013/114499
PCT Pub. Date: Aug. 8, 2013

(65) Prior Publication Data
US 2014/0362017 A1 Dec. 11, 2014

(30) Foreign Application Priority Data

Feb. 1, 2012 (JP) .................................. 2012-020005

(51) Int. Cl.
G06F 3/0488 (2013.01)
G06F 3/041 (2006.01)
G06F 3/0481 (2013.01)
G06F 3/0484 (2013.01)

(52) U.S. Cl.
CPC ............ *G06F 3/0412* (2013.01); *G06F 3/0481* (2013.01); *G06F 3/04842* (2013.01); *G06F 3/04883* (2013.01); *G06F 2203/04101* (2013.01)

(58) Field of Classification Search
CPC .... G06F 3/0488; G06F 3/04883; G06F 3/044
See application file for complete search history.

(56) References Cited

U.S. PATENT DOCUMENTS 6,954,899 B1* 10/2005 Anderson ............... G06F 3/016
345/157
2002/0060669 A1* 5/2002 Sze ......................... G06F 3/017
345/173

(Continued)

FOREIGN PATENT DOCUMENTS

JP 10-260671 9/1998
JP 2004-86733 3/2004

(Continued)

OTHER PUBLICATIONS

International Search Report (PCT/ISR/210 with English language translation) and Written Opinion (PCT/ISA/237), mailed Mar. 12, 2013, in corresponding International Application No. PCT/JP2012/007801.

*Primary Examiner* — Ricardo L Osorio
(74) *Attorney, Agent, or Firm* — Greenblum & Bernstein, P.L.C.

(57) ABSTRACT

An input device is equipped with a touch panel for detecting an input, a coordinates acquiring unit for detecting input coordinates which are coordinates of the input detected by the touch panel, and a pull manipulation judging unit which, when an input to an input detection surface which is a surface on which the touch panel is placed, makes effective the Z coordinate in the direction perpendicular to the input detection surface among the input coordinates detected by the coordinates acquiring unit.

12 Claims, 23 Drawing Sheets

(56) References Cited

U.S. PATENT DOCUMENTS

| | | | |
|---|---|---|---|
| 2002/0064382 A1* | 5/2002 | Hildreth | G06K 9/00375 396/100 |
| 2004/0108995 A1 | 6/2004 | Hoshino et al. | |
| 2005/0001815 A1 | 1/2005 | Tsunoda | |
| 2010/0127970 A1 | 5/2010 | Oba et al. | |
| 2011/0286090 A1* | 11/2011 | Beauchamp | F42B 35/00 359/369 |
| 2011/0291945 A1 | 12/2011 | Ewing, Jr. et al. | |
| 2014/0056502 A1* | 2/2014 | Twellmann | G06T 7/0012 382/131 |

FOREIGN PATENT DOCUMENTS

| | | |
|---|---|---|
| JP | 2008-077655 | 4/2008 |
| JP | 2010-128545 | 6/2010 |

* cited by examiner (A)

(B)

| PULL MANIPULATION REGION ID | START POINT | | END POINT | |
|---|---|---|---|---|
| | Xo | Yo | Xt | Yt |
| 1 | 100 | 100 | 200 | 150 |
| ... | ... | ... | ... | ... |

TB1

FIG. 3
(A)
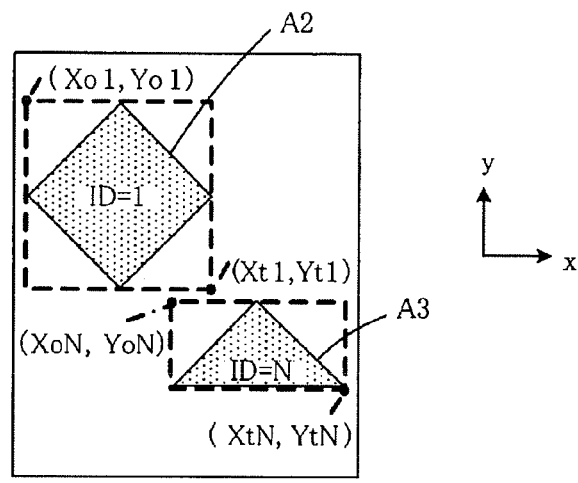
IMAGERY OF ENTIRE PICTURE
(B)
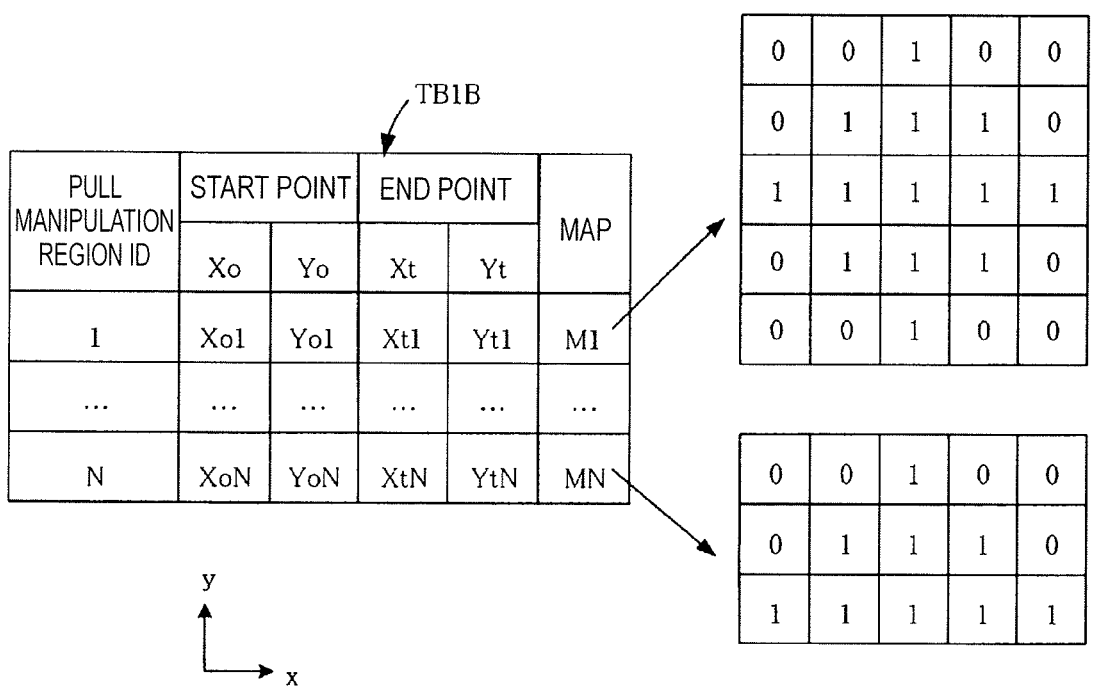

INPUT DEVICE, INPUT CONTROL METHOD, AND INPUT CONTROL PROGRAM

TECHNICAL FIELD

The present invention relates to an input device, an input control method, and an input control program. More specifically, the invention relates to electronic apparatus etc. having a touch panel which can detect coming into proximity or contact of an object as an input.

BACKGROUND ART

Many of recent electronic apparatus such as personal computers and portable terminals as typified by smartphones are equipped with a touch panel which is placed on the display screen as a device for input manipulation. General input devices using a touch panel detect an input manipulation according to two kinds of states, that is, contact and non-contact, of a user finger to the touch panel surface.

On the other hand, portable terminals such as smartphones have various kinds of functions. And it is desirable that one of the various kinds of functions be able to be selected by a user input manipulation and performed. However, in general input devices, a user manipulation is recognized by only occurrence/non-occurrence of a touch to the touch panel. Therefore, to select a desired one of various kinds of functions and have it performed, the user is required to make many touch manipulations. That is, no input devices are available that are high in operability to users.

In apparatus using an input device other than a touch panel, a technique is known in which a manipulation in three axial directions, that is, the X-axis and Y-axis directions (parallel with the input manipulation surface) and the Z-axis direction (perpendicular to the input manipulation surface) is detected and reflected in display.

For example, Patent document 1 proposes that a manipulation relating to selection through a 3D menu is made using a control stick capable of detecting an input manipulation in three axial directions, that is, the X-axis, Y-axis, and Z-axis directions.

Patent document 2 proposes detection of a movement of an apparatus main body in three axial directions using a 3-axis acceleration sensor. Also, Patent document 2 discloses varying the display side of information on the screen in accordance with a movement in the Z-axis direction.

PRIOR ART DOCUMENTS

Patent Documents

Patent document 1: JP-A-10-260671
Patent document 2: JP-A-2008-077655

SUMMARY OF THE INVENTION

Problems to be Solved by the Invention

Assume a case of making a manipulation using, for example, a touch panel capable of detecting an input manipulation in three axial directions. In this case, even if the user intends to make a manipulation only in the Z-axis direction, the apparatus may recognize that the manipulation also has components in the X-axis and Y-axis directions and perform an erroneous operation. Likewise, even if the user intends to make a manipulation only in the X-axis and Y-axis directions, the apparatus may recognize that the manipulation also has a component in the Z-axis direction and perform an erroneous operation.

The present invention has been made in the above circumstances, and an object of the present invention is to provide an input device, an input control method, and an input control program which can prevent erroneous detection of a Z coordinate when an input is made in the X and Y directions.

Means for Solving the Problems

The invention provides an input device comprising an input detection unit for detecting an input; a coordinates detection unit for detecting input coordinates which are coordinates of the input detected by the input detection unit; and a control unit which, when an input to an input detection surface which is a surface on which the input detection unit is placed is detected, makes effective a Z coordinate that is in a direction perpendicular to the input detection surface among the input coordinates detected by the coordinates detection unit.

The invention also provides an input control method comprising the steps of detecting input coordinates which are coordinates of the input detected by an input detection unit for detecting an input; and when an input to an input detection surface which is a surface on which the input detection unit is placed is detected, making effective a Z coordinate that is in a direction perpendicular to the input detection surface among the detected input coordinates.

The invention also provides input control program for causing a computer to execute the steps of the above input control method.

In the above configuration, method, or program, a Z coordinate is not detected until detection of contact to the input detection surface. Therefore, erroneous detection can be prevented when an input is made in the X and Y directions.

Advantages of the Invention

The invention makes it possible to prevent erroneous detection of a Z coordinate when an input is made in the X and Y directions.

BRIEF DESCRIPTION OF THE DRAWINGS

FIGS. 3(A) and 3(B) show an example structure of a table that is used for managing free-shape regions used in the first embodiment of the invention.

MODES FOR CARRYING OUT THE INVENTION

Figure 1:
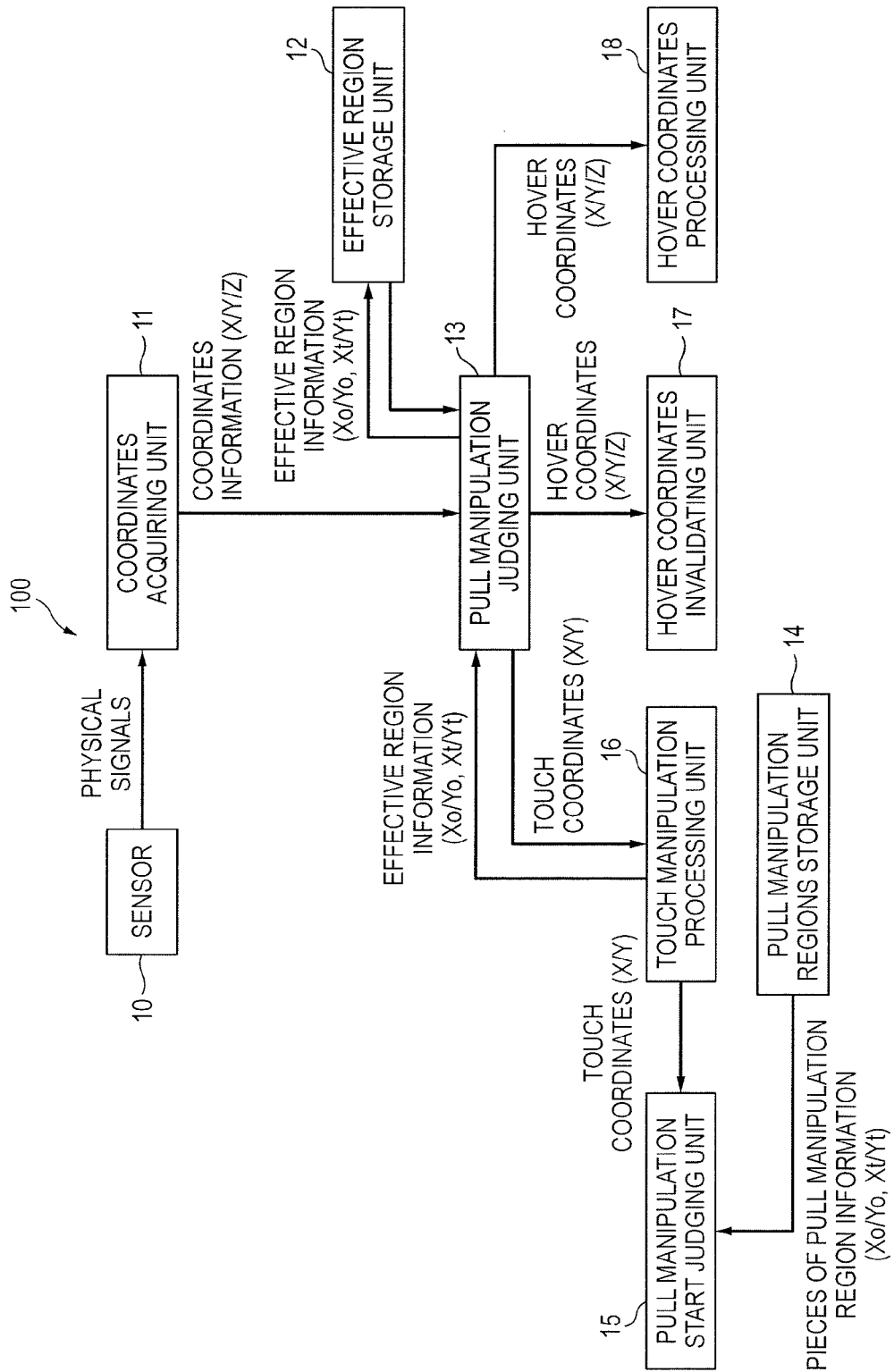
FIG. 1 is a block diagram showing an example configuration of an input device according to a first embodiment of the present invention.

Embodiments of the present invention will be hereinafter described with reference to the drawings.
(Embodiment 1)
FIG. 1 is a block diagram showing an example configuration of an input device according to a first embodiment of the invention. As shown in FIG. 1, the input device 100 is equipped with a sensor 10, a coordinates acquiring unit 11, an effective region storage unit 12, a pull manipulation judging unit 13, a pull manipulation regions storage unit 14, a pull manipulation start judging unit 15, a touch manipulation processing unit 16, a hover coordinates invalidating unit 17, and a hover manipulation processing unit 18.

Although not shown in FIG. 1, actually, the input device 100 is also equipped with a display unit having a screen on which various kinds of visible information such as characters, figures, and images can be displayed.

It is supposed that the input device 100 is commercialized being incorporated in various apparatus such as smartphones, cellphone terminals, portable information terminals, portable music players, and personal computers. A main control system of the input device 100 can be implemented either as dedicated hardware or using a microcomputer as the nucleus. Where a microcomputer is used, necessary functions can be implemented by reading control programs prepared in advance into the microcomputer and executing them.

The sensor 10, which is a sensor of a touch panel, detects presence and a position of a finger that has touched (i.e., come into contact with) or come close to a manipulation surface TP1 (touch panel surface; see FIG. 6 to be referred to later) of the touch panel. The touch panel is placed on the display unit and functions as an input detection unit for detecting an input.

The coordinates acquiring unit 11 acquires coordinates information representing position coordinates of a finger or the like on the basis of signals that are output from the sensor 10. The coordinates acquiring unit 11 has a function of a coordinates detection unit for detecting coordinates (input coordinates) of an input detected by the input detection unit.

This coordinates information includes pieces of coordinate information (X coordinate and Y coordinate, also referred to simply as "X" and "Y") in the X axis and the Y axis which are parallel with the manipulation surface TP1 of the touch panel and coordinate information (Z coordinate) in the Z-axis direction which is perpendicular to the X axis and the Y axis. The coordinate information in the Z-axis direction corresponds to a height from the manipulation surface TP1 of the touch panel. A judgment may be made using not only position information but also the intensity of a signal produced by the sensor 10 which corresponds to the position information.

The pull manipulation judging unit 13 performs judgment processing relating to a pull manipulation. The pull manipulation is a manipulation that the user lifts up a finger from the manipulation surface TP1 of the touch panel (i.e., moves it away from the manipulation surface TP1). The pull manipulation thus means a manipulation corresponding to a height (Z coordinate, also referred to simply as "Z") in the Z-axis direction.

Pieces of information indicating respective regions to which the range where a pull manipulation can be made is restricted (pieces of pull manipulation region information) are held in the effective region storage unit 12 and the pull manipulation regions storage unit 14. The pull manipulation regions storage unit 14 holds, in advance, information indicating a pull manipulation region in every displayable picture. The effective region storage unit 12 temporarily holds information indicating a pull manipulation region that is effective in a currently displayed picture. The pull manipulation judging unit 13 refers to the effective pull manipulation region information that is held by the effective region storage unit 12.

If a pull manipulation is not effective and recognition of a Z coordinate has not been started yet, the pull manipulation judging unit 13 outputs hover coordinates (X/Y/Z) to the hover coordinates invalidating unit 17. The term "hovering" means a state that a finger or the like is close to the manipulation surface TP1 of the touch panel and the sensor 10 can detect an input. On the other hand, if a pull manipulation is effective and recognition of a Z coordinate has already been started, the pull manipulation judging unit 13 outputs hover coordinates (X/Y/Z) to the hover manipulation processing unit 18.

The pull manipulation start judging unit 15 performs judgment processing relating to a start of a pull manipulation. For example, when the user has touched the touch panel in a particular pull manipulation region, the pull manipulation start judging unit 15 judges that a pull manipulation has been started. The pull manipulation start judging unit 15 may judge that a pull manipulation has been started when such a touch state has been maintained for a prescribed time or longer (long-time push). With this measure, an event can be prevented that processing corresponding to a pull manipulation is started by an unintended touch. Furthermore, the pull manipulation start judging unit 15 may judge that a pull manipulation has been started when the user has made a release (cancellation of a touch state) after such a long-time push.

Figure 2:
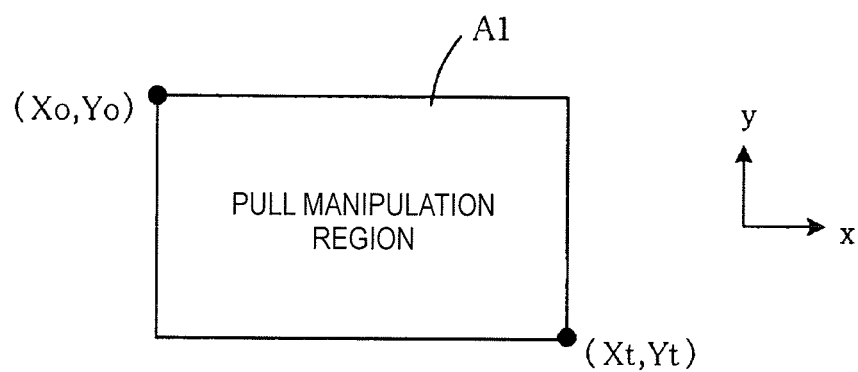
FIGS. 2(A) and 2(B) show an example structure of a table that is used for managing rectangular regions used in the first embodiment of the invention.

The touch manipulation processing unit 16 performs processing relating to a user touch manipulation. For example, when a touch to the manipulation surface TP1 of the touch panel is detected, the touch manipulation processing unit 16 receives touch coordinates (X/Y) from the pull manipulation judging unit 13 and gives them to the pull manipulation start judging unit 15. When a finger release is detected, the touch manipulation processing unit 16 gives the pull manipulation judging unit 13 pull manipulation region information (Xo/Yo, Xt/Yt) (see FIG. 2) which is information indicating a pull manipulation region corresponding to the released finger.

The hover coordinates invalidating unit 17 invalidates hover coordinates (X/Y/Z) that are detected when a finger is not in contact with the manipulation surface TP1 of the touch panel.

The hover manipulation processing unit 18 performs prescribed processing corresponding to a hover manipulation on the basis of hover coordinates (X/Y/Z) that are output from the pull manipulation judging unit 13. Therefore, the hover manipulation processing unit 18 performs processing taking into consideration not only detected X and Y coordinates but also a detected Z coordinate. For example, to manipulate an application for handling a phone book (address book), the hover manipulation processing unit 18 enables a manipulation shown in FIG. 5. A specific operation of the hover manipulation processing unit 18 will be described later.

Next, the pull manipulation region will be described in detail.

In the input device 100, the ranges (spaces) where a pull manipulation can be made are restricted to only predetermined pull manipulation regions. Pieces of pull manipulation region information are held in the effective region storage unit 12 and the pull manipulation regions storage unit 14.

The pull manipulation region may have any of various shapes such as a rectangle, a circle, and a free shape. FIGS. 2(A) and 2(B) show an example structure of a table that is used in the case where the pull manipulation region has a rectangular shape. FIGS. 3(A) and 3(B) show an example structure of a table that is used in the case where the pull manipulation region has a free shape.

Where the pull manipulation region has a rectangular shape, pieces of information indicating two sets of coordinates on a diagonal of the rectangle in the X-Y plane, that is, coordinates (Xo, Yo) of the top-left start point and coordinates (Xt, Yt) of the bottom right end point (see FIG. 2(A)), are used.

It is expected that plural independent pull manipulation regions are set in a single picture or different pull manipulation regions are set in respective pictures. Therefore, as in a region table TB1 shown in FIG. 2(B), pieces of information indicating plural pull manipulation regions can be held in the pull manipulation regions storage unit 14 by assigning pull manipulation region IDs to the respective pull manipulation regions. Since it is necessary to determine in the range of what pull manipulation region an input has been detected, a pull manipulation region where an input has been detected is recognized as an effective pull manipulation region. The pull manipulation judging unit 13 causes information indicating this pull manipulation region to be held in the effective region storage unit 12.

For example, when attention is paid to the pull manipulation region having the pull manipulation region ID "1," pieces of information held in the region table TB1 that are start coordinates (Xo, Yo)=(100, 100) and end coordinates (Xt, Yt)=(200, 150) come to be held by the effective region storage unit 12.

Where the pull manipulation region has a circular shape, pieces of information that are coordinates representing the center of the circle and a radius of the circle are used.

Where the pull manipulation region has a free shape, as shown in FIGS. 3(A) and 3(B), information indicating an associated rectangle in the X-Y plane and information of, for example, a bit map in the inside area of the rectangle are used.

For example, to identify a rhombic region A2 shown in FIG. 3(A), start coordinates (Xo1, Yo1) and end coordinates (Xt1, Yt1) of the rectangle that circumscribes the region A2 and pattern data of a bit map M1 for discrimination between the region A2 which is inside the rectangular region and the other region (background) are held in a region table TB1B so as to be correlated with a pull manipulation region ID "1." In the bit map M1, a value "1" at each pixel position indicates that it is located inside the region and a value "0" at each pixel position indicates that it is located outside the region.

To identify a triangular region A3 shown in FIG. 3(A), start coordinates (XoN, YoN) and end coordinates (XtN, YtN) of the rectangle that circumscribes the region A3 and pattern data of a bit map MN for discrimination between the region A3 which is inside the rectangular region and the other region (background) are held in the region table TB1B so as to be correlated with a pull manipulation region ID "N." In the bit map MN, a value "1" at each pixel position indicates that it is located inside the region and a value "0" at each pixel position indicates that it is located outside the region.

Next, a description will be made of finger movements that are supposed in the embodiment and how the input device 100 operates.

Figure 4:
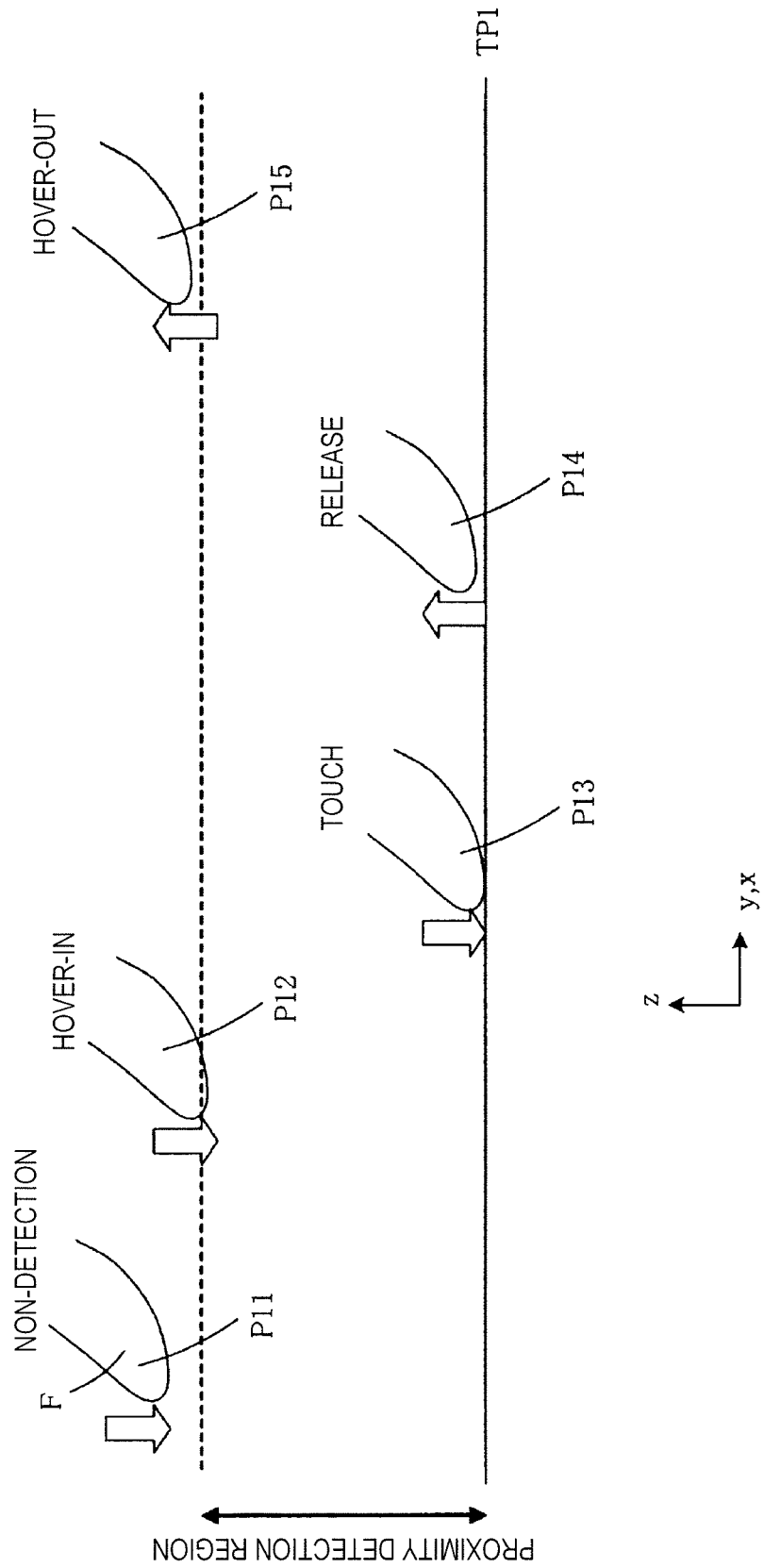
FIG. 4 is a schematic diagram illustrating a relationship between a finger movement that is expected when a user manipulation is made and sets of coordinates to be recognized, in the first embodiment of the invention.

FIG. 4 illustrates an example relationship between a finger movement that is expected when a user manipulation is made and sets of coordinates to be recognized. FIG. 4 assumes a case that a user finger F is moved in the Z-axis direction with respect to the manipulation surface TP1 of the touch panel. A proximity detection region shown in FIG. 4 indicates a range where a user finger F can be detected by the sensor 10 as being in a proximity state.

As shown in FIG. 4, the position of the user finger F varies in order of P11, P12, P13, P14, and P15. At position P11 where the user finger F is too distant from the manipulation surface TP1 of the touch panel for the sensor 10 to detect the user finger F. Thus, the user finger F is in an undetected state. When the user has brought the finger F closer to the manipulation surface TP1 to reach position P12, since the user finger F has entered the proximity detection region, the sensor 10 detects it as being in a proximity state. The input device 100 recognizes this state as a "hover-in" state.

When the user has brought the finger F into contact with the manipulation surface TP1 of the touch panel at position P13, the sensor 10 detects it as contact, that is, a touch. When after the touch the user has moved the finger F to position P14 which is distant from the manipulation surface TP1 of the touch panel, the sensor 10 detects it as non-contact, that is, a release. When the user has further lifted up the finger F to position P15 which is outside the proximity detection region, the sensor 10 no longer detects the finger F. The input device 100 recognizes this state as a "hover-out" state.

The input device 100 recognizes, as sets of hover coordinates, sets of coordinates that are detected in a non-contact state, that is, during a period from an instant when the user finger F goes into a hover-in state to an instant when it is rendered into a hover-out state (see FIG. 4). Furthermore, the input device 100 recognizes, as sets of touch coordinates, sets of coordinates that are detected during a period from an instant when the user finger F touches the manipulation surface TP1 of the touch panel to an instant when it is released (see FIG. 4).

In the embodiment, the sensor 10 always detects inputs in all of the X-axis, Y-axis, and Z-axis directions. Detection signals are recognized as touch coordinates if the detection signal in the Z-axis direction is larger than a prescribed threshold value (it is assumed here that the intensity of a detection signal increases as the position becomes closer to the touch panel), and are recognized as hover coordinates if the detection signal in the Z-axis direction is not larger than the prescribed threshold value.

Figure 5:
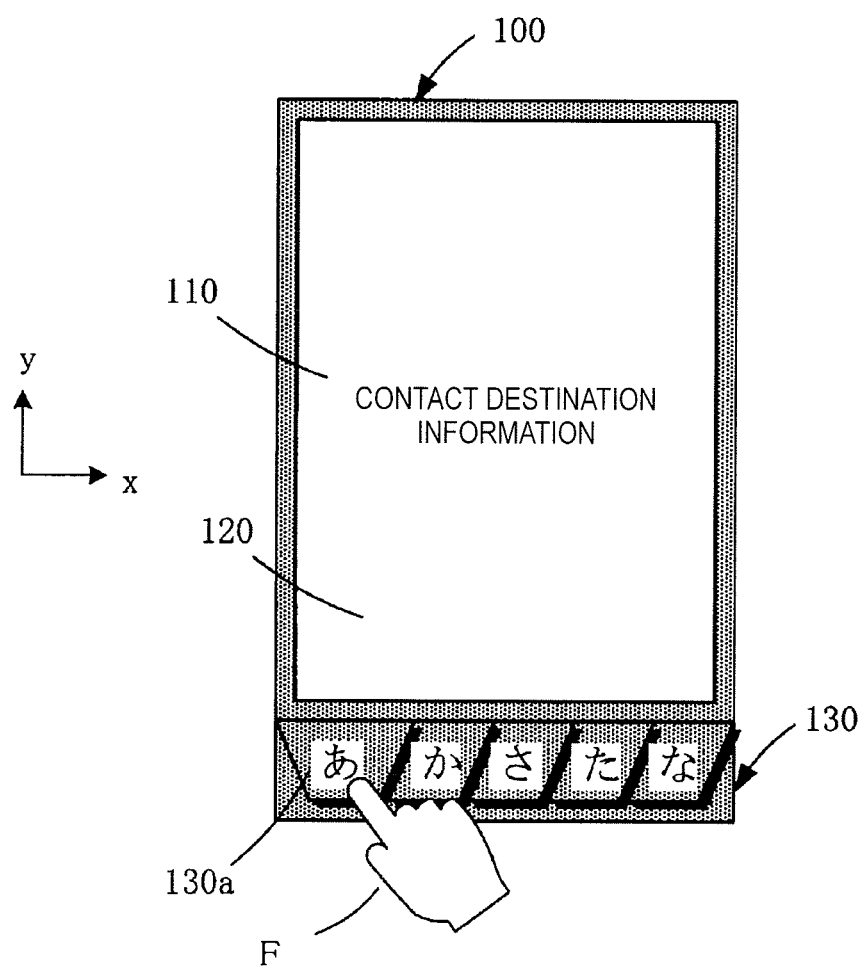
FIG. 5 is a view illustrating an example as to how a specific application is manipulated in the input device according to the first embodiment of the invention.
Figure 6:
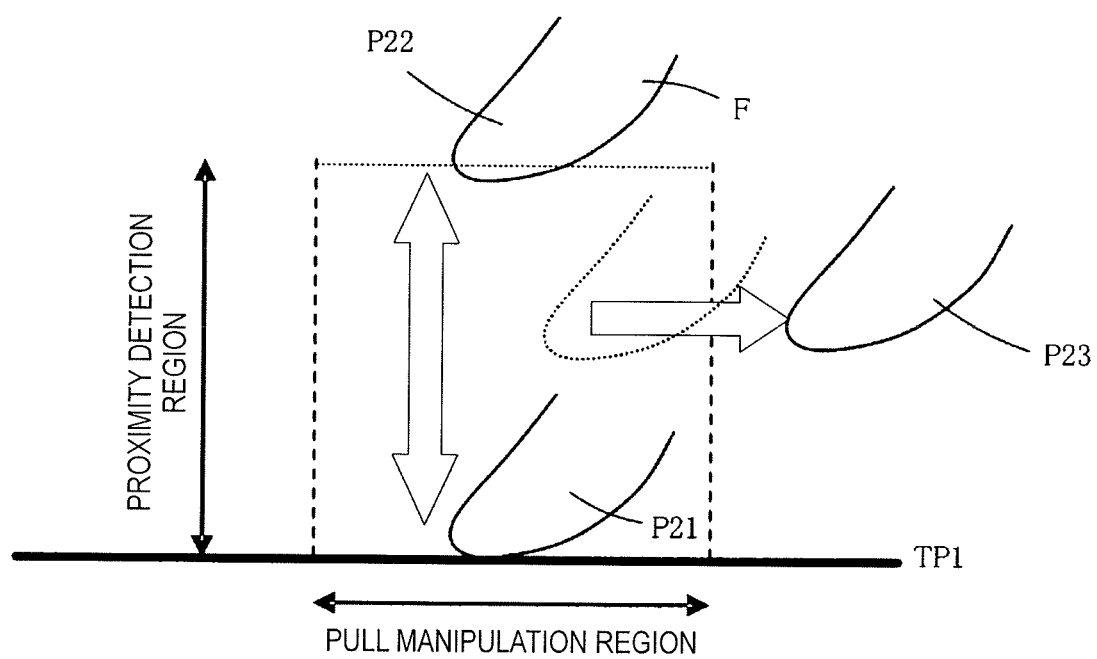
FIG. 6 is a schematic diagram illustrating an example finger movement corresponding to the manipulation illustrated by FIG. 5.

Next, a description will be made of how an application is manipulated in the input device 100. FIG. 5 is a state transition diagram illustrating an example as to how a specific application is manipulated in the input device 100. FIG. 6 illustrates an example finger movement corresponding to the manipulation illustrated by FIG. 5.

The example of FIG. 5 assumes a case that the input device 100 runs an application having a function of manipulating the contents of a phone book (address book) which is a database registered in the input device 100.

As shown in FIG. 5, the input device 100 is equipped with the screen of a display unit 110 and a touch panel 120 which is placed on the screen. A region in which to display contact destination information and an index manipulation region 130 are displayed on the screen of the display unit 110.

The index manipulation region 130 has plural independent tabs (selection manipulation portions) indicating classification items such as an "あ, row," "か row" "さ row," "た row," and "な row."

For the classification item "あ row," pieces of information (data) of contact destinations whose head characters are "あ," "い," "う," "え," or "お" are arranged in order of, for example, "あ," "い," "う," "え," and "お." For the classification item "か row," pieces of information of contact destinations whose head characters are "か," "き," "く," "け," or "こ," are arranged. For the classification item "さ row," pieces of information of contact destinations whose head characters are "さ," "し," "す," "せ," or "そ" are arranged. For the classification item "た row," pieces of information of contact destinations whose head characters are "た," "ち," "つ," "て," or "と" are arranged. For the classification item "な row," pieces of information of contact destinations whose head characters are "な," "に," "ぬ," "ね," or "の" are arranged.

For example, if the "あ row" region 130a of the index manipulation region 130 is manipulated, the hover manipulation processing unit 18 accesses the pieces of information of the contact destinations whose head characters are "あ," "い," "う," "え," or "お."

In the embodiment, if as shown in FIG. 6 the user makes a pull manipulation of varying the finger position in the Z-axis direction from position P21 to P22, the hover manipulation processing unit 18 switches the display item in order from the first item to the last item of the "あ row" in accordance with the height in the Z-axis direction (i.e., Z coordinate).

To prevent an operation that is not intended by the user, the above operation is started after recognizing that the user is going to make a pull manipulation. More specifically, in the input device 100, if the user has maintained, for a long time, a state that his or her finger is in contact with the "あ row" region 130a of the index manipulation region 130, the input device 100 recognizes it and performs processing corresponding to a pull manipulation. If the user lifts up the finger in the Z-axis direction as a pull manipulation, the display (selection) item (contact destination information) is switched in order in accordance with the height in the Z-axis direction.

On the other hand, if the finger is moved to position P23 which is outside the index manipulation region 130 (in particular, "あ row" region 130a) which corresponds to a pull manipulation region (see FIG. 6), the input device 100 finishes the processing corresponding to the pull manipulation while maintaining the display of the current display item. That is, the switching of the contact destination information is finished and the display state is maintained.

Therefore, a result of processing corresponding to a pull manipulation can be finalized by the user's moving a finger out of a pull manipulation region by moving it in the X-Y plane after starting the pull manipulation. Thus, a finalizing manipulation can be made by a short-distance movement in a short time.

Figure 23:
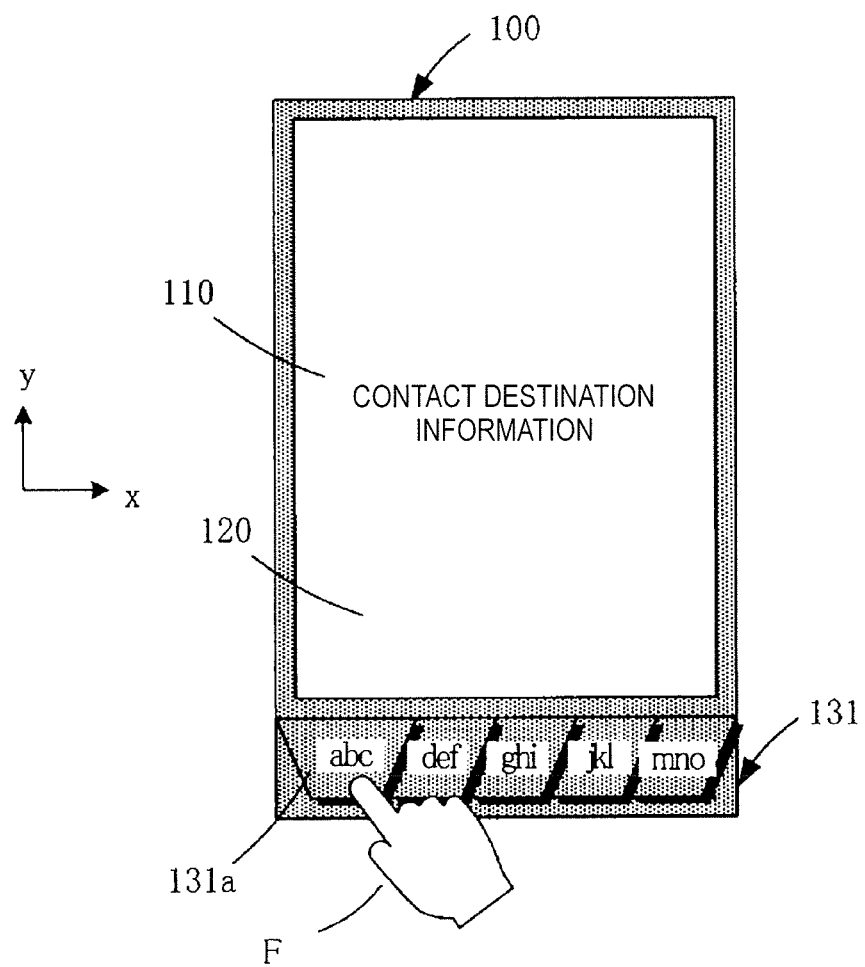
FIG. 23 is a view illustrating an example as to how another specific application is manipulated in the input device according to the first embodiment of the invention.

FIG. 23 is a state transition diagram illustrating an example as to how another specific application is manipulated in the input device 100. FIG. 23 is different from FIG. 5 in that an index manipulation region 131 replaces the index manipulation region 130.

The index manipulation region 131 has plural independent tabs (selection manipulation portions) indicating classification items such as an "abc," "def" "ghi," "jkl," "mno," etc.

For the classification item "abc," pieces of information (data) of contact destinations whose head characters are "a," "b," or "c" are arranged in order of, for example, "a," "b," and "c." For the classification item "def," pieces of information of contact destinations whose head characters are "d," "e," or "f" are arranged. For the classification item "ghi," pieces of information of contact destinations whose head characters are "g," "h," or "i" are arranged. For the classification item "jkl," pieces of information of contact destinations whose head characters are "j," "k," or "l" are arranged. For the classification item "mno," pieces of information of contact destinations whose head characters are "m," "n," or "o" are arranged.

For example, if the "abc" region 131a of the index manipulation region 131 is manipulated, the hover manipulation processing unit 18 accesses the pieces of information of the contact destinations whose head characters are "a," "b," or "c." The user is to make manipulations and the input device 100 operates in response to the manipulations in the same manners as described above.

Next, a description will be made of how the input device 100 operates.

Figure 7:
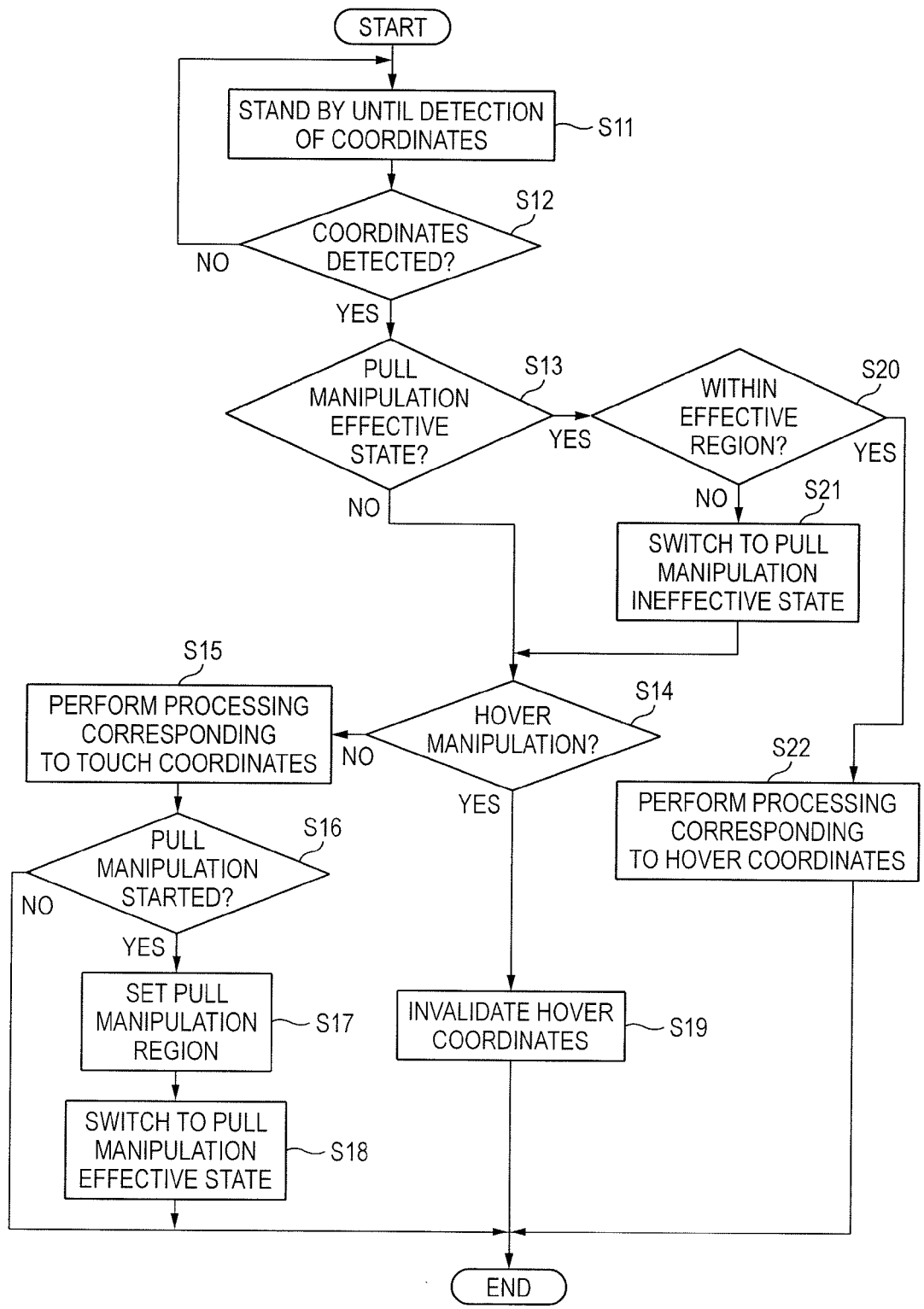
FIG. 7 is a flowchart showing an example essential process of the input device according to the first embodiment of the invention.

FIG. 7 is a flowchart showing an example essential process of the input device 100.

At steps S11 and S12, the coordinates acquiring unit 11 monitors outputs of the sensor 10 and stands by until occurrence of an input manipulation. If the sensor 10 detects a certain variation due to a movement of a user finger or the like, the process moves from step S12 to S13.

At step S13, the pull manipulation judging unit 13 judges whether or not the current state is associated with an effective pull manipulation. The initial state is with no effective pull manipulation, and the current state is judged to be associated with an effective pull manipulation if conditions to be described below are satisfied. The process moves to step S14 if the judgment result is negative, and moves to step S20 if the judgment result is affirmative.

At step S14, the pull manipulation judging unit 13 makes discrimination between a hover manipulation and a touch manipulation on the basis of the Z coordinate of the detected finger. The process moves to step S19 if the manipulation is a hover manipulation, and moves to step S15 if the manipulation is a touch manipulation.

At step S15, the touch manipulation processing unit 16 performs prescribed processing on the basis of touch coordinates (X/Y) detected when the finger touches the manipulation surface TP1 of the touch panel. For example, the touch manipulation processing unit 16 selects, as a manipulation target, an object (e.g., icon) displayed at the position of the coordinates or performs a function that is assigned to that object.

At step S16, the pull manipulation start judging unit 15 acquires, from the pull manipulation regions storage unit 14, all usable pieces of pull manipulation region information in the picture. The pull manipulation start judging unit 15 then judges whether or not the conditions for making a judgment that a pull manipulation has been started are satisfied through comparison of the touch coordinates (X/Y) received from the touch manipulation processing unit 16. For example, the conditions are judged to be satisfied if one of the touch coordinates is within one pull manipulation region, the touch state concerned has been maintained for a prescribed time or longer (long-time push), and the finger has been released thereafter. If the conditions are satisfied, the process moves to step S17.

At step S17, based on the judgment result "pull manipulation started" of the pull manipulation start judging unit 15, the pull manipulation judging unit 13 sets the touch/release-detected pull manipulation region as an effective region. In this case, the pull manipulation judging unit 13 stores information indicating the effective region in the effective region storage unit 12. The information (Xo/Yo, Xt/Yt) indicating the effective region is extracted from the pull manipulation regions storage unit 14 and written to the effective region storage unit 12 via the touch manipulation processing unit 16 and the pull manipulation judging unit 13.

For example, in the example of FIG. 5, the regions corresponding to the tabs "あ row," "い row," "う row," "え row," and "お row" are extracted from the pull manipulation regions storage unit 14 and compared with the touch coordinates at step S16. If, as in the example of FIG. 5, the user has made a long-time-push manipulation in the range of the "あ row" tab, the information indicating the one pull manipulation region representing the "あ row" tab range is selected and written to the effective region storage unit 12 as information indicating an effective region.

At step S18, the pull manipulation judging unit 13 switches from the pull manipulation ineffective state to the pull manipulation effective state.

At step S19, the hover coordinates invalidating unit 17 invalidates hover coordinates. That is, hover coordinates are invalidated in the case where the finger position is outside a pull manipulation region or a pull manipulation has not been started yet. This prevents an event that the user's varying the height of the finger in the Z-axis direction affects the operation of the input device 100, as a result of which processing corresponding to a hover manipulation is performed erroneously.

At step S20, the pull manipulation judging unit 13 compares the coordinates (X/Y) received from the coordinates acquiring unit 11 with the range of the pull manipulation region that is held by the effective region storage unit 12 as an effective region and thereby judges whether or not the input coordinates are within the effective region. The process moves to step S22 if the input coordinates are within the effective region, and moves to step S21 if the input coordinates are outside the effective region.

For example, in the example illustrated by the right part of FIG. 5, it is judged at step S20 whether the position of the user finger is inside or outside the "あ row" region 130a.

At step S21, since the finger has been moved to outside the range of the effective region, the pull manipulation judging unit 13 switches from the pull manipulation effective state to the pull manipulation ineffective state.

At step S22, the hover manipulation processing unit 18 performs prescribed processing on the basis of hover coordinates acquired by the coordinates acquiring unit 11. For example, in the example illustrated by the right part of FIG. 5, since the "あ row" region 130a is a target of the pull manipulation, the display item is changed in accordance with the Z coordinate of the finger (see FIG. 6) among the many contact destination items that are registered in the phone book as belonging to the "あ row."

As described above, in the input device 100, after contact to the input detection surface is detected by the input detection unit, the pull manipulation judging unit 13 performs a control to start recognition of the Z coordinate which is the coordinate in the direction perpendicular to the input detection surface among input coordinates of an input to the input detection surface. That is, the pull manipulation judging unit 13 makes the Z coordinate effective. The control unit is the pull manipulation judging unit 13, for example. The input detection surface of the input detection unit is, for example, the manipulation surface TP1 of the touch panel.

With the above measure, the Z coordinate is not recognized until detection of contact to the input detection surface. This prevents an event that a Z coordinate is detected erroneously when an input is made in the X and Y directions. For example, since use of a Z coordinate is started upon occurrence of a release (i.e., end of a touch state), an erroneous operation can be prevented that the operation state is varied depending on the position in the Z-axis direction when the user does not intend it.

The control unit sets, in the input detection surface, a Z coordinate detection region where to detect a Z coordinate. And the control unit starts recognition of the Z coordinate among input coordinates of an input to the Z coordinate detection region after contact to the Z coordinate detection region is detected by the input detection unit. The Z coordinate detection region is a pull manipulation region, for example.

With the above measure, a variation in the Z coordinate is not reflected in the control unless the user touches the Z coordinate detection region on the touch panel with a finger. Therefore, an erroneous operation due to a manipulation that is not intended by the user can be prevented. For example, an erroneous operation due to unintended contact can be prevented by restricting a pull manipulation region to a particular object being displayed.

Furthermore, the control unit starts recognition of the Z coordinate among input coordinates of an input to the Z coordinate detection region after contact to the Z coordinate detection region that has lasted a prescribed time or longer is detected by the input detection unit. An example of contact that lasts the prescribed time or longer is a long-time push.

With this measure, if the user has touched the Z coordinate detection region erroneously only for a short time, recognition of a Z coordinate is not started. Therefore, discrimination can be made clearly between a manipulation intended by the user and a manipulation not intended.

Still further, the control unit varies a parameter of a prescribed function that is assigned to the Z coordinate detection region on the basis of the Z coordinate of input coordinates that have been detected by the coordinates detection unit after contact to the Z coordinate detection region is detected by the input detection unit. The control unit is the hover manipulation processing unit 18, for example. The parameter of the prescribed function is, for example, a parameter for searching "あ row" items of a telephone function.

With this measure, the user can adjust the parameter of the function that is assigned to the Z coordinate detection region in which to make a pull manipulation.

The control unit may invalidate the input coordinates detected by the coordinates detection unit until contact to the input detection surface is detected by the input detection unit. The control unit is the hover coordinates invalidating unit 17, for example.

With this measure, for example, an erroneous operation that is not intended by the user can be prevented from occurring due to a Z coordinate variation when a pull manipulation has not been started yet.

The control unit may suspend the detection of the Z coordinate of input coordinates by the coordinates detection unit until contact to the input detection surface is detected by the input detection unit. The control unit is the pull manipulation judging unit 13, for example.

With this measure, an erroneous operation that is not intended by the user can be prevented from occurring due to a Z coordinate variation when a pull manipulation has not been started yet. The power consumption can thus be suppressed.

(Embodiment 2)

Figure 8:
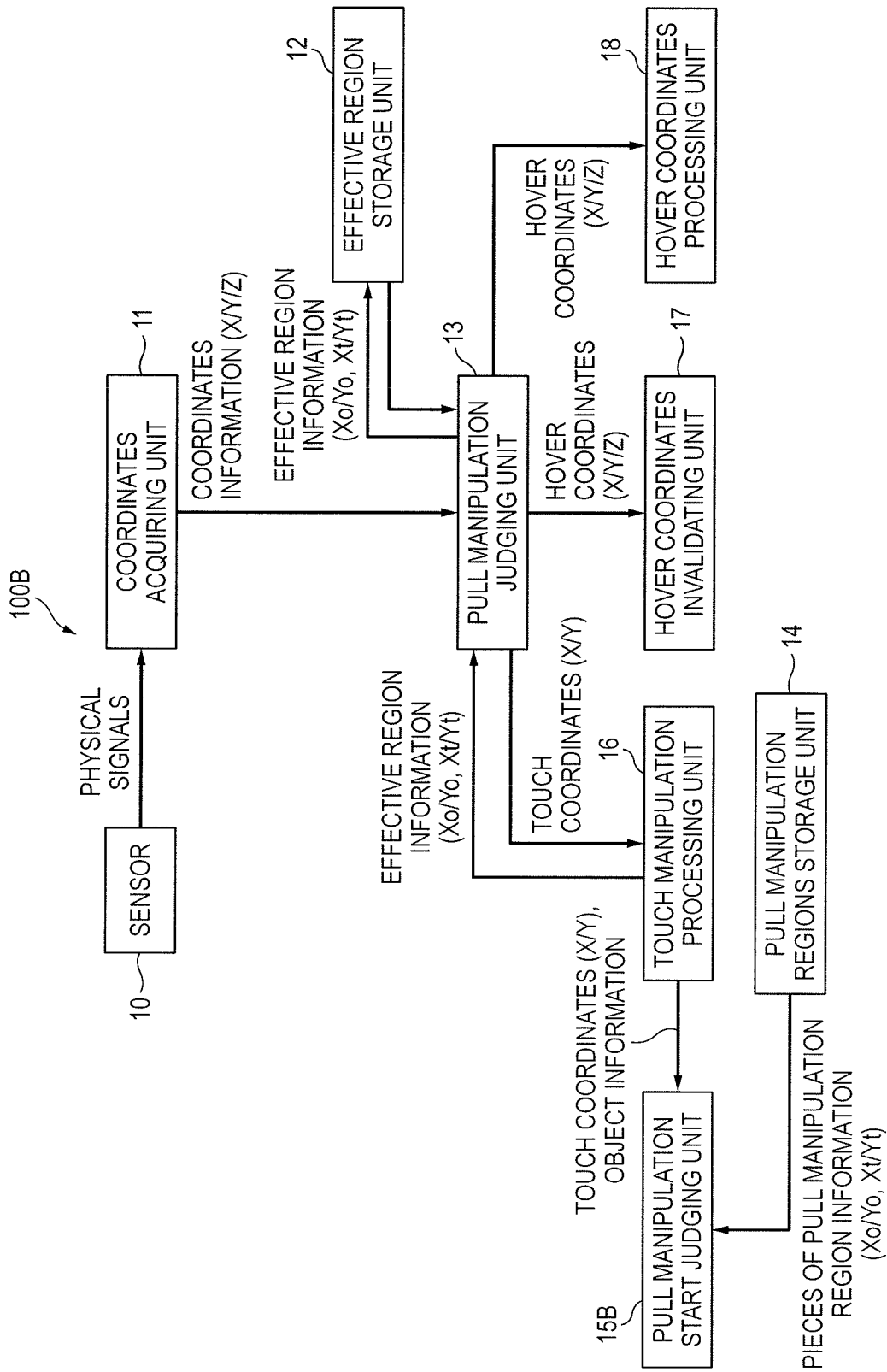
FIG. 8 is a block diagram showing an example configuration of an input device according to a second embodiment of the invention.

FIG. 8 is a block diagram showing an example configuration of an input device according to a second embodiment of the invention. Constituent elements in FIG. 8 having equivalent ones in the input device according the above embodiment shown in FIG. 1 are given the same reference symbols as the latter.

As shown in FIG. 8, the input device 100B is equipped with a sensor 10, a coordinates acquiring unit 11, an effective region storage unit 12, a pull manipulation judging unit 13, a pull manipulation regions storage unit 14, a pull manipulation start judging unit 15B, a touch manipulation processing unit 16, a hover coordinates invalidating unit 17, and a hover manipulation processing unit 18.

That is, the pull manipulation start judging unit 15B is the only element that is different than in the input device 100 and pull manipulation start judgment processing is different than in the first embodiment. Descriptions of the other elements will be omitted because they are equivalent to the corresponding ones of the input device according to the above-described embodiment.

The pull manipulation start judging unit 15B performs judgment processing which relates to a start of a pull manipulation. For example, the pull manipulation start judging unit 15B judges that a pull manipulation has been started when the user has selected an object (e.g., an icon displayed on the screen) that is assigned a particular function by touching the touch panel with a finger, dragged the object into the range of a particular pull manipulation region (i.e., moved the finger while it is kept in contact with the touch pane), and released the finger inside that range.

Next, a description will be made of how to manipulate an application in the input device 100B.

Figure 9:
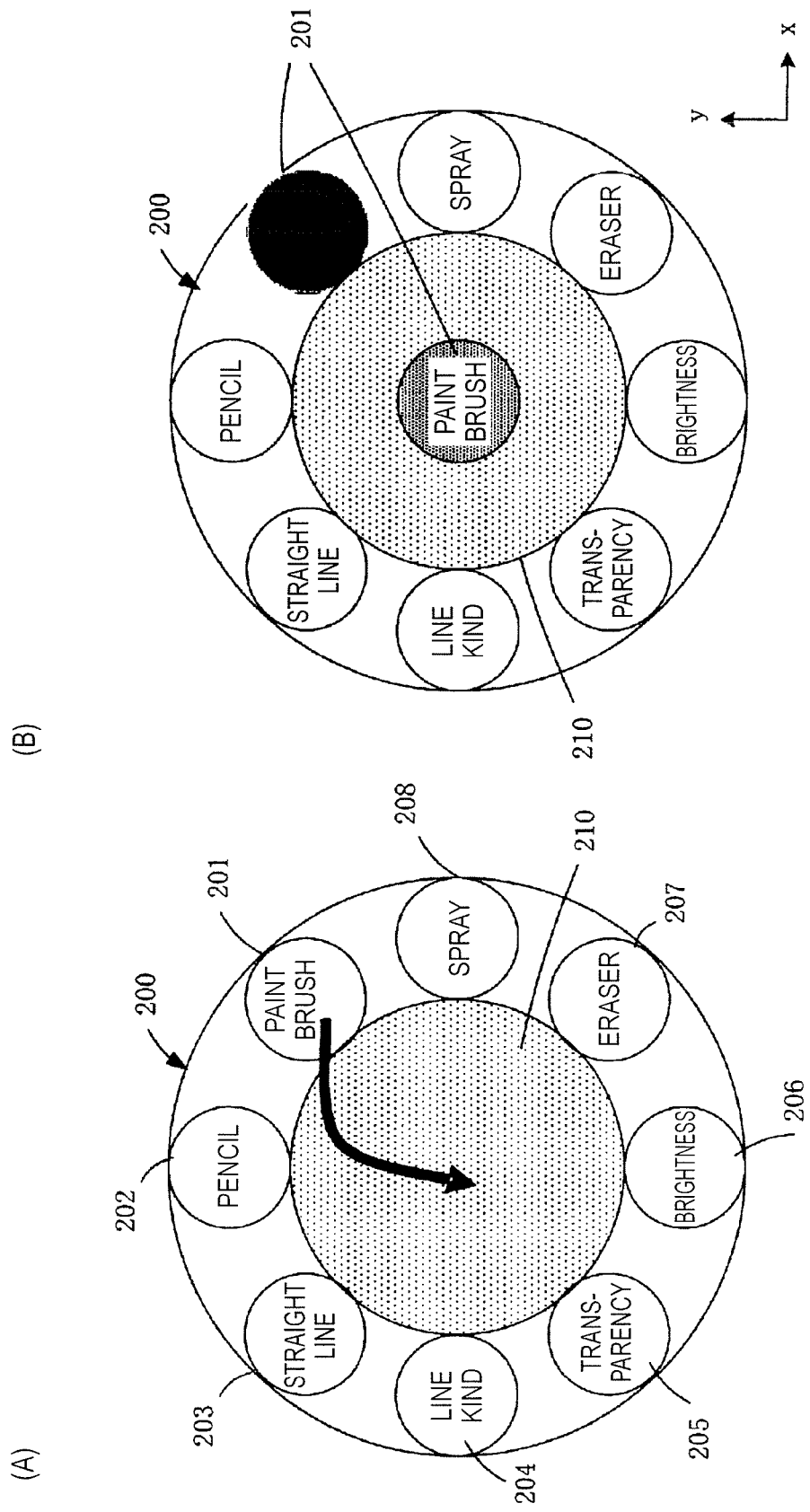
FIGS. 9(A) and 9(B) illustrate a state transition of an example manipulation made for a specific application in the input device according to the second embodiment of the invention.
Figure 10:
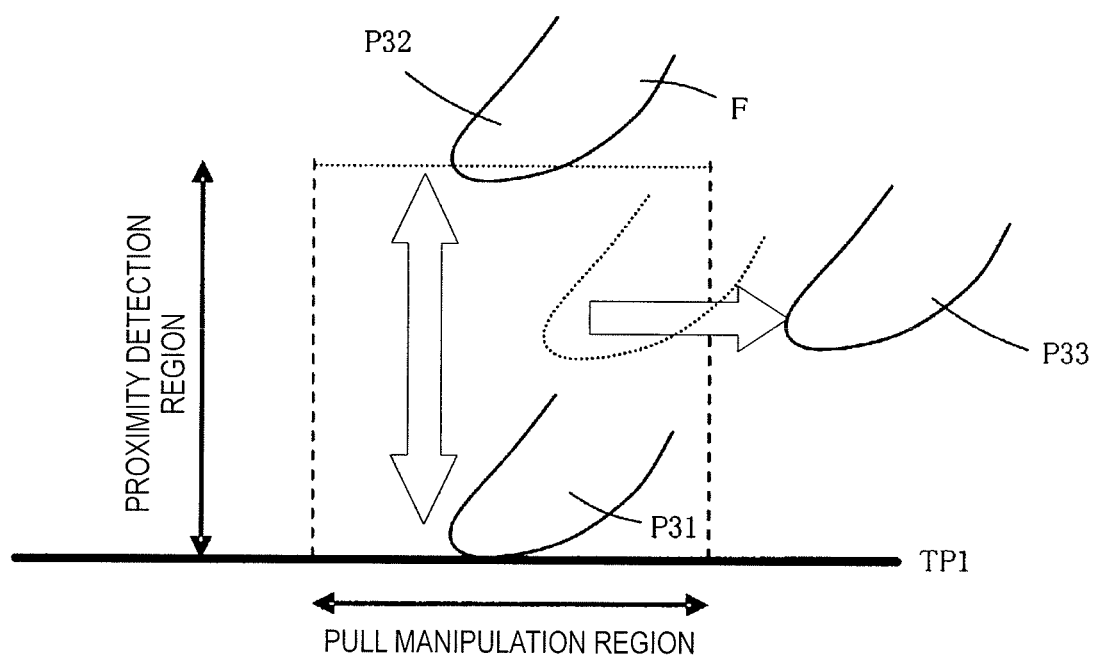
FIG. 10 illustrates an example finger movement corresponding to the manipulation illustrated by FIGS. 9(A) and 9(B).

FIGS. 9(A) and 9(B) illustrate a state transition of an example manipulation made for a specific application in the input device 100B. FIG. 10 illustrates an example finger movement corresponding to the manipulation illustrated by FIGS. 9(A) and 9(B).

The example of FIGS. 9(A) and 9(B) assumes a case that the input device 100 runs a painting software application having functions for drawing and figure edition. As shown in FIGS. 9(A) and 9(B), a manipulation region 200 of the application contains tool regions 201-208 and a pull manipulation region 210.

Objects that are assigned different functions are correlated with the respective tool regions 201-208. More specifically, as shown in FIGS. 9(A) and 9(B), objects having functions of "paint brush," "pencil," "straight line," "line kind," "transparency," "brightness," "eraser," and "spray" are correlated with the tool regions 201-208, respectively. The tool regions 201-208 are arranged in a ring-like manner and a circular pull manipulation region 210 is disposed inside them.

The objects corresponding to the respective tool regions 201-208 can be dragged by the user. FIG. 9(A) assumes that the user selects the object corresponding to the tool region 201 by touching it with a finger and drags the selected object into the range of the pull manipulation region 210.

The sensor 10 and the coordinates acquiring unit 11 detect this drag manipulation, and the touch manipulation processing unit 16 switches the display contents of the manipulation region 200 as shown in FIG. 9(B). That is, the touch manipulation processing unit 16 displays that the object having the function "paint brush" has been dragged from the tool region 201 into the pull manipulation region 210.

As shown in FIG. 9(B), the object corresponding to the one of the tool regions 201-208 has been dragged into the pull manipulation region 210. The pull manipulation start judging unit 15B recognizes this as a start of a pull manipulation.

Upon the recognition of the start of the pull manipulation, the hover manipulation processing unit 18 starts varying a parameter relating to the tool being subjected to the pull manipulation. More specifically, as shown in FIG. 10, when the user moves the finger in the Z-axis direction in the range between positions P31 and P32, the parameter relating to the selected object is varied in accordance with the Z coordinate.

In the example of FIGS. 9(A) and 9(B), since the user has dragged the "paint brush" object into the pull manipulation region 210, the hover manipulation processing unit 18 varies, for example, the thickness of drawing as the parameter of "paint brush."

For example, the hover manipulation processing unit 18 varies the thickness parameter so as to produce a thinner drawing line as the finger comes closer to the manipulation surface TP1 of the touch panel (see FIG. 10) and to produce a thicker drawing line as the finger becomes more distant from the manipulation surface TP1 (i.e., as its position becomes higher).

When the finger has moved to position P33 which is outside the range of the pull manipulation region 210 (FIG. 10), the pull manipulation judging unit 13 judges that the pull manipulation has been finished. Therefore, after this movement, the parameter is no longer varied even if the user varies the height of the finger.

Next, a description will be made of how the input device 100B operates.

In the following, a description will be made of how the pull manipulation start judging unit 15B operates. The other constituent elements operate in the same manners as described above with reference to FIG. 7.

Figure 11:
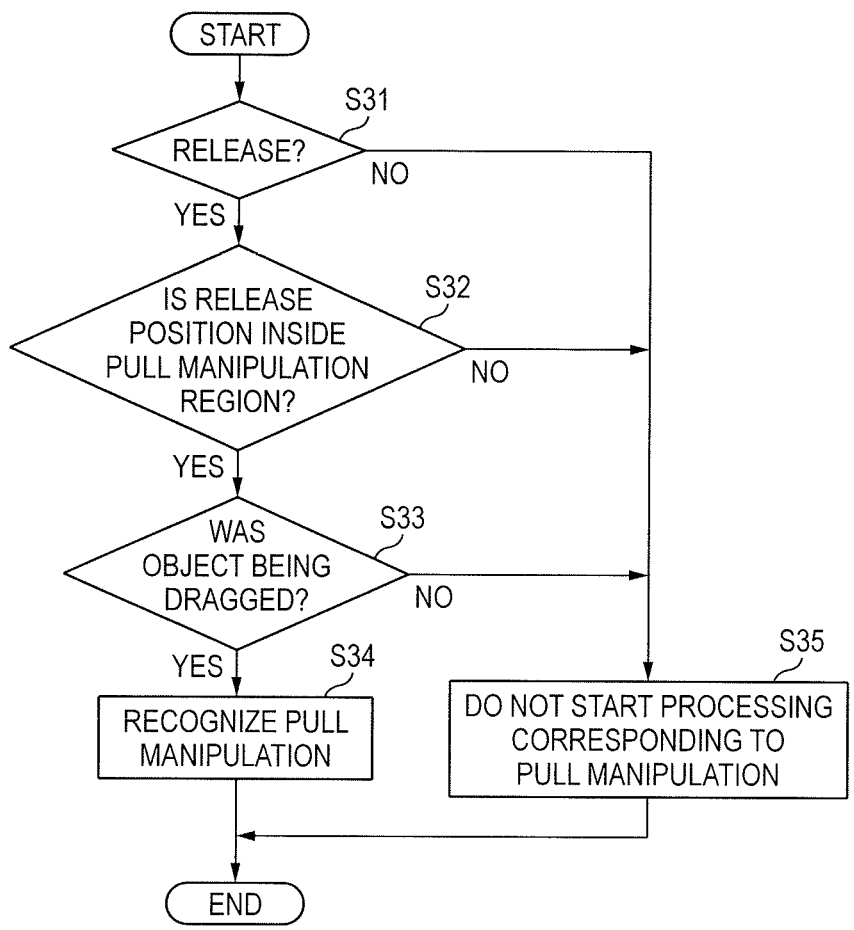
FIG. 11 is a flowchart showing an example essential process of the input device according to the second embodiment of the invention.

FIG. 11 is a flowchart showing an example process executed by the pull manipulation start judging unit 15B. The process of FIG. 11 corresponds to, for example, steps S16-S18 in FIG. 7.

At step S31, the pull manipulation start judging unit 15B monitors a state of outputs of the sensor 10 and judges whether a finger release has been detected or not. The process moves to step S32 if a finger release has been detected, and moves to step S35 if not.

At step S32, the pull manipulation start judging unit 15B receives coordinates (X/Y) that were detected at the time of the detection of the finger release. The process moves to step S33 if the finger release was detected inside a pull manipulation region, and moves to step S35 if the finger release was detected outside a pull manipulation region.

At step S33, the pull manipulation start judging unit 15B judges whether or not an object was being dragged when the finger release was detected. The process moves to step S34 if an object was being dragged, and moves to step S35 if not.

For example, in the case where the user touches the "paint brush" object of the tool region 201 with a finger and moves it into the pull manipulation region 210 (see FIG. 9(A)), the process moves to step S34 at an instant when the user completes the drag manipulation and releases the finger.

At step S34, the pull manipulation start judging unit 15B recognizes the start of a pull manipulation. As a result, a transition is made to the state of FIG. 9(B) (see the manipulation region 200), whereby processing corresponding to a pull manipulation is enabled.

At step S35, the pull manipulation start judging unit 15B does not start processing corresponding to a pull manipulation. That is, the state is maintained that processing corresponding to a pull manipulation cannot be performed.

As described above, in the input device 100B, the input detection surface has the Z coordinate detection region and functional regions which are assigned prescribed functions. The functional regions are the tool regions 201-208, for example. The control unit controls a parameter of a function that is assigned to the dragged functional region on the basis of the Z coordinate of input coordinates that have been detected by the coordinates detection unit after an input indicating that a functional region has been dragged to the Z coordinate detection region is detected by the input detection unit. The control unit is the hover manipulation processing unit 18, for example. For example, parameters of the functions assigned to the functional regions are parameters of "paint brush," "spray," "eraser," etc.

With this measure, the user can select a function as a target of parameter change by a simple drag manipulation and vary the parameter by adjusting the pulling height of a finger. Furthermore, it becomes possible to prevent an erroneous operation due to unintended contact that cannot be prevented only by the restrictions relating to finger release and a pull manipulation region.

(Embodiment 3)

Figure 12:
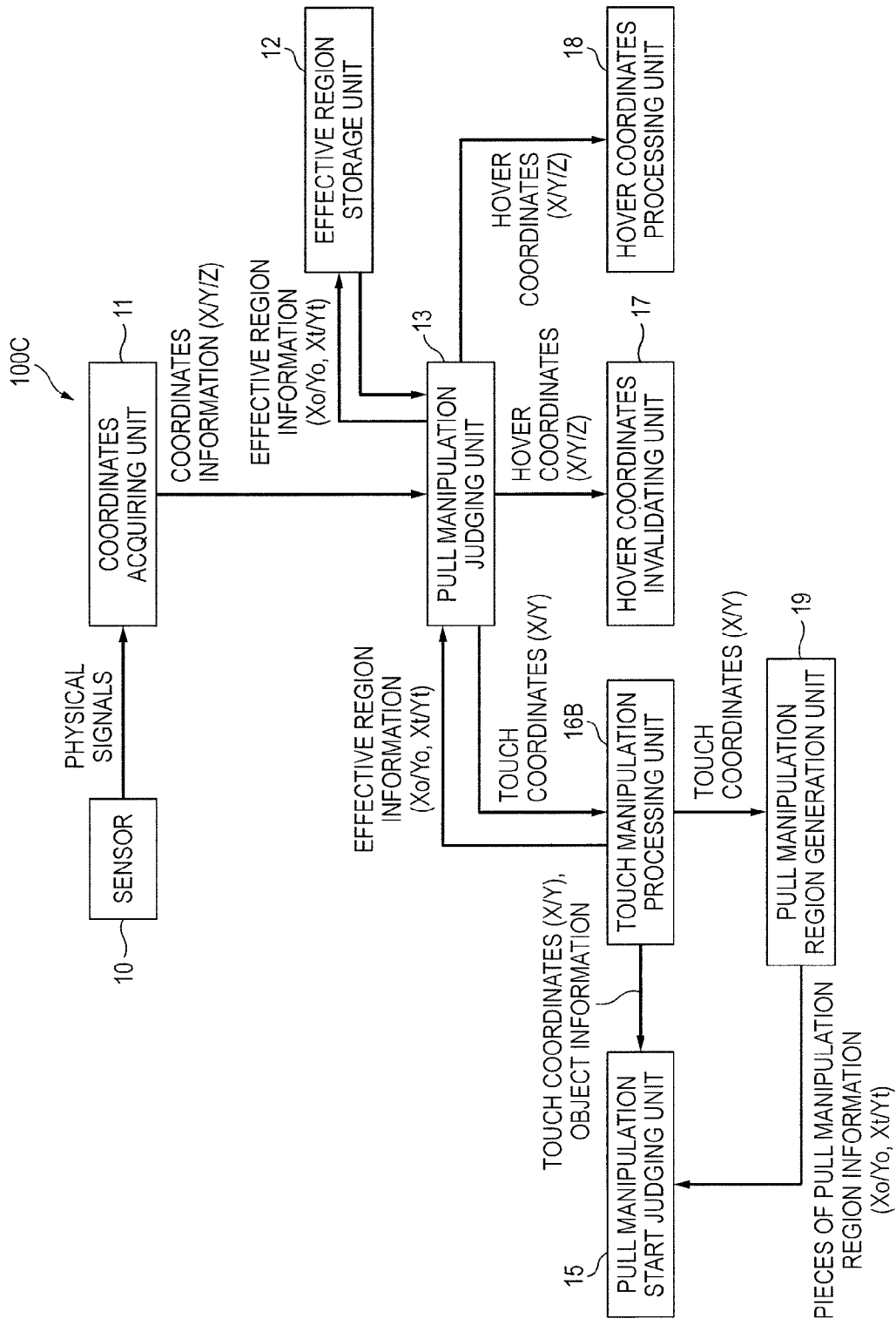
FIG. 12 is a block diagram showing an example configuration of an input device according to a third embodiment of the invention.

FIG. 12 is a block diagram showing an example configuration of an input device 100 according to a third embodiment of the invention. Constituent elements in FIG. 12 having equivalent ones in the input device 100 according the above-described embodiment are given the same reference symbols as the latter.

As shown in FIG. 12, the input device 100C is equipped with a sensor 10, a coordinates acquiring unit 11, an effective region storage unit 12, a pull manipulation judging unit 13, a pull manipulation start judging unit 15, a touch manipulation processing unit 16B, a hover coordinates invalidating unit 17, a hover manipulation processing unit 18, and a pull manipulation region generation unit 19.

That is, the input device 100C is equipped with the pull manipulation region generation unit 19 and the touch manipulation processing unit 16B in place of the pull manipulation regions storage unit 14 and the touch manipulation processing unit 16 of the input device 100, respectively. Descriptions of the other elements will be omitted because they are equivalent to the corresponding ones of the input device according to the above-described embodiment.

When a particular input manipulation is detected, the pull manipulation region generation unit 19 receives touch coordinates (X/Y) from the touch manipulation processing unit 16B and generates a pull manipulation region on the basis of the received touch coordinates. The term "particular input manipulation" means, for example, a touch to or a long-time push of an object (e.g., folder) on which a pull manipulation can be made.

The information (Xo/Yo, Xt/Yt) generated by the pull manipulation region generation unit 19 and indicating the range of the pull manipulation region is input to the pull manipulation start judging unit 15. The pull manipulation start judging unit 15 makes a pull manipulation start judgment on the basis of the range of the pull manipulation region.

The pull manipulation region generation unit 19 also functions as the pull manipulation regions storage unit 14. That is, the pull manipulation region generation unit 19 holds information of the generated pull manipulation region.

Next, a description will be made of how to manipulate an application in the input device 1000.

Figure 13:
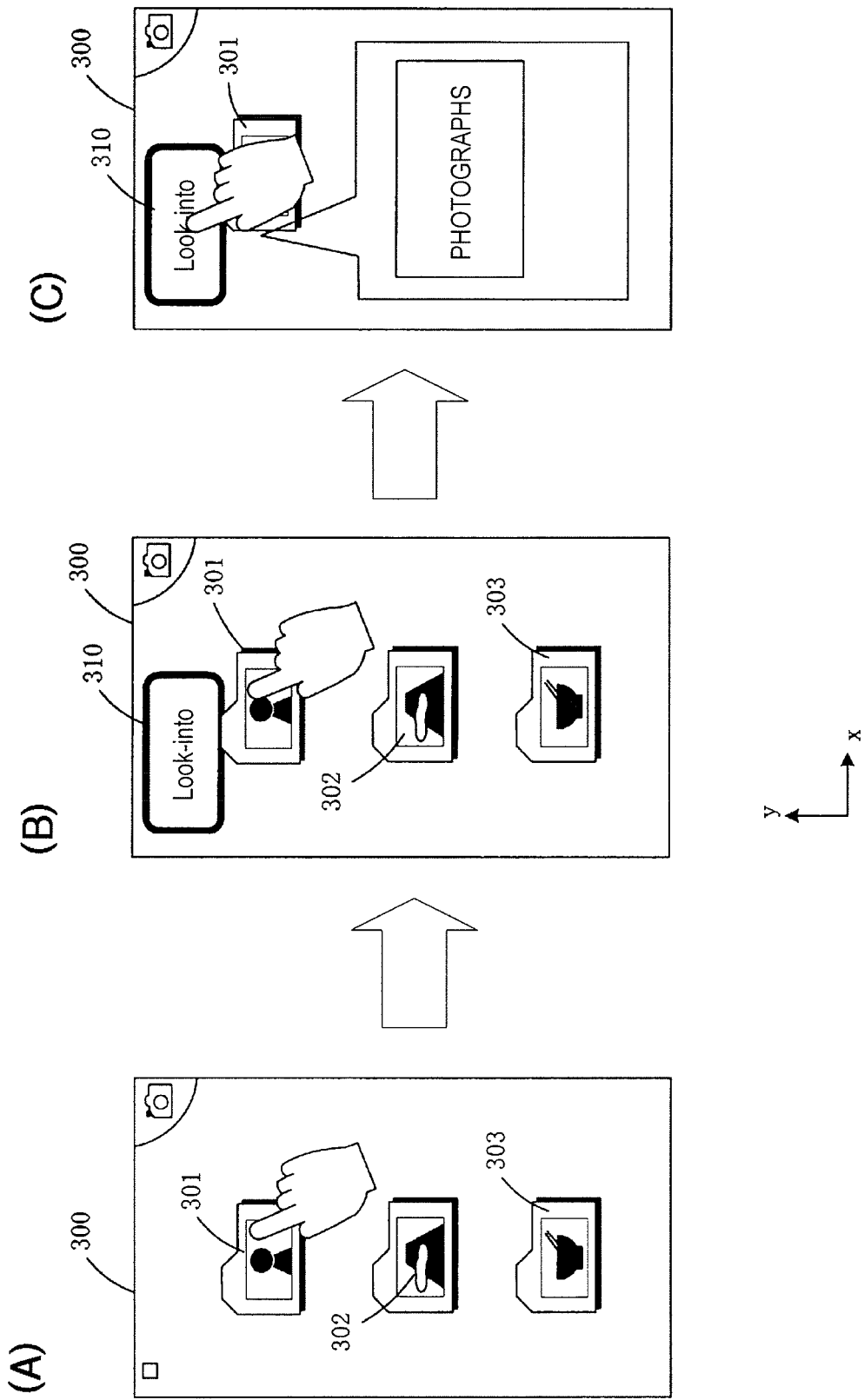
FIGS. 13(A)-13(C) illustrate state transitions of an example manipulation made for a specific application in the input device according to the third embodiment of the invention.
Figure 14:
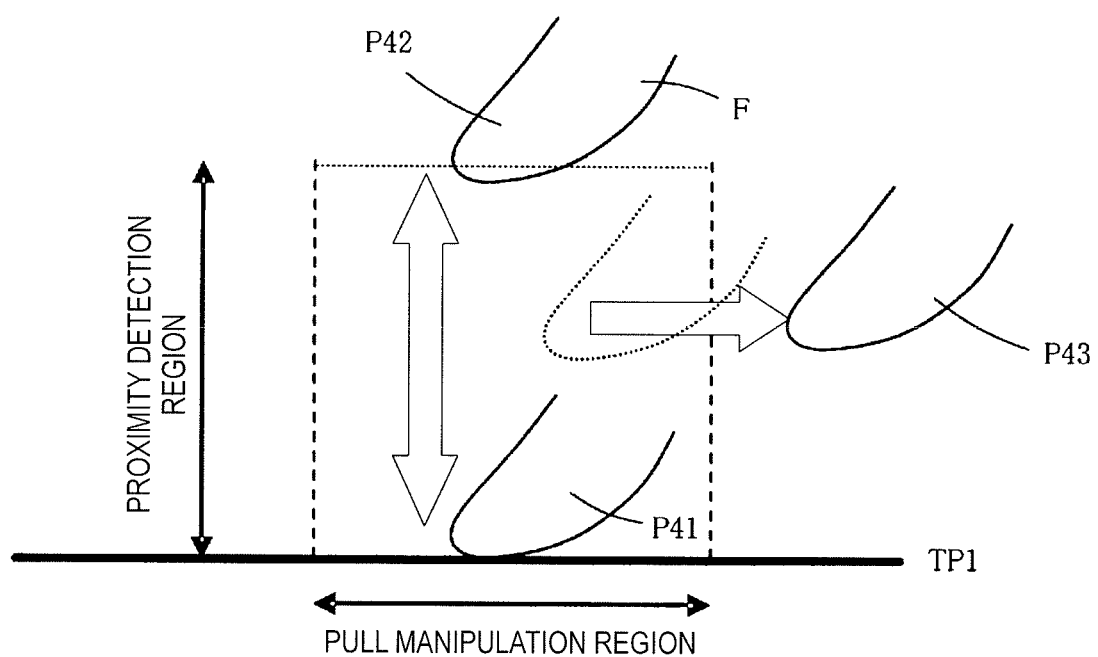
FIG. 14 illustrates an example finger movement corresponding to the manipulation illustrated by FIGS. 13(A)-13(C).

FIGS. 13(A)-13(C) illustrate state transitions of an example manipulation made for a specific application in the input device 100C. FIG. 14 illustrates an example finger movement corresponding to the manipulation illustrated by FIGS. 13(A)-13(C).

In the example of FIGS. 13(A)-13(C), folder regions 301, 302, and 303 are arranged in an application manipulation region 300 on the touch panel. Folder objects are assigned to the respective folder regions 301, 302, and 303. Each folder functions as a storage area for storing various data files of photographs etc. For example, the application manipulation region 300 covers the entire touch panel which is placed on the screen.

FIG. 13(A) assumes a state that the user is touching the folder region 301 with a finger. The object of the folder region 301 is assigned a function of displaying a pull manipulation region 310 in the form of a pop-up as shown in FIG. 13(B) when the folder region 301 has been pushed for a long time with a finger. The pull manipulation region 310 is displayed in the vicinity of the touch coordinates, that is, the folder region 301, by the pull manipulation region generation unit 19.

The pull manipulation region 310 is assigned a "look-into" function. FIG. 13(B) assumes that the user drags the object of the folder region 301 to the position of the displayed pull manipulation region 310 with the finger (S103). That is, the user touches the folder region 301 with a finger and moves the finger into the pull manipulation region 310 while maintaining the touch.

When the object of the folder region 301 is dragged into the pull manipulation region 310, the display in the manipulation region 300 makes a transition to the state shown in FIG. 13(C). As shown in FIG. 13(C), a preview region 320 is newly displayed on the screen (S104). Photographs etc. stored in the folder being manipulated are preview-displayed in the preview region 320.

Processing corresponding to a pull manipulation is started upon the preview display of FIG. 13(C). That is, as the user varies the Z coordinate of the finger in the range between positions P41 and P42 shown in FIG. 14 in the pull manipulation region 310, the hover manipulation processing unit 18 switches the item to be displayed in the preview region 320 (i.e., the selected file such as a photograph in the folder) in accordance with the height.

When the user finger is moved to position P43 which is outside the range of the pull manipulation region 310 (see FIG. 14), the pull manipulation judging unit 13 judges that the pull manipulation has been finished. Therefore, the item to be displayed is not switched even if the user varies the finger height after that movement.

Next, a description will be made of an example process of the input device 100C.

In the following, a description will be made of how the pull manipulation region generation unit 19 operates. The other constituent elements operate in the same manners as described above with reference to FIG. 7 or 11.

Figure 15:
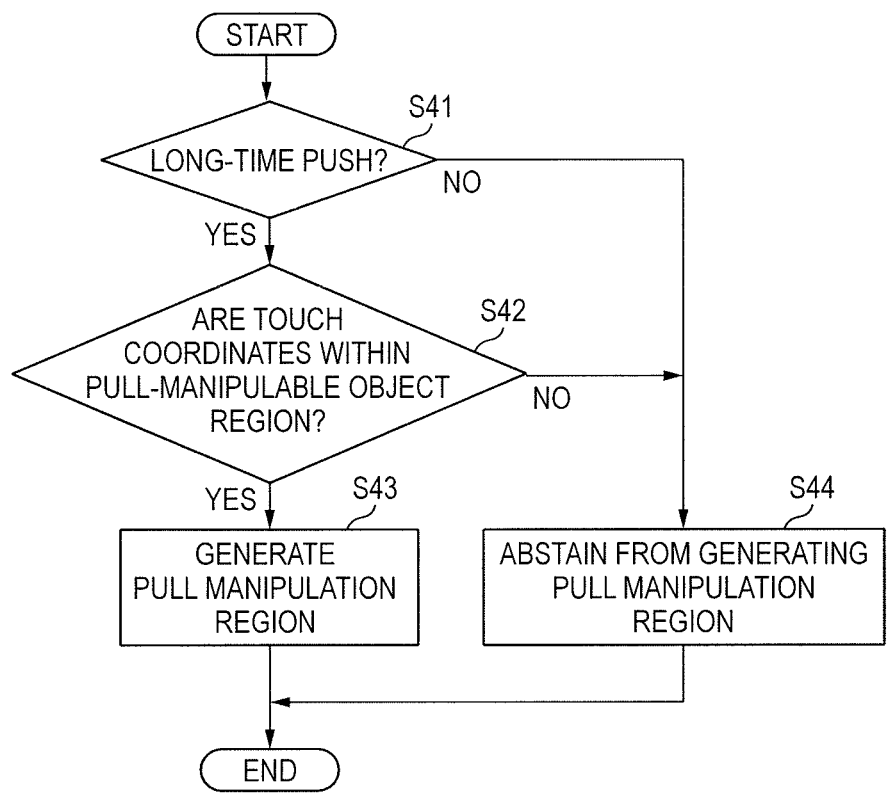
FIG. 15 is a flowchart showing an example essential process of the input device according to the third embodiment of the invention.

FIG. 15 is a flowchart showing an example essential process of the input device 100C. The process of FIG. 15 is executed, for example, between steps S12 and S13 shown in FIG. 7.

At step S41, the pull manipulation region generation unit 19 monitors touch coordinates (X/Y) that are output from the touch manipulation processing unit 16B and judges whether or not a long-time push has occurred in a manipulation region on the touch panel. The process moves to step S42 if a long-time push has been detected, and moves to step S44 if not.

At step S42, the pull manipulation region generation unit 19 judges whether or not the long-time-push-detected coordinates are within the range of a pull-manipulable object. The process moves to step S43 if they are within the range of such an object, and moves to step S44 if not.

For example, if a long-time push is detected in the pull-manipulable folder region 301 (see FIG. 13(A)), the process moves from step S42 to step S43.

At step S43, the pull manipulation region generation unit 19 generates a pull manipulation region 310 having a prescribed size at a position that is separated from the touch coordinates (X/Y) by a prescribed distance. Alternatively, a pull manipulation region 310 having a prescribed size may be generated at a position that is separated from a prescribed position (e.g., the center or a corner) of the pull-manipulable object region containing the touch coordinates by a prescribed distance. As a further alternative, a pull manipulation region 310 having a prescribed size may be generated at a prescribed position on the touch panel.

At step S44, the pull manipulation region generation unit 19 abstains from generating a pull manipulation region 310. Therefore, the pull manipulation start judging unit 15 maintains the pull-manipulation-ineffective state.

As described above, in the input device 100C, the input detection surface has a functional region which is assigned a prescribed function. The control unit generates a Z coordinate detection region in the input detection surface when contact to the functional region is detected. The control unit is the pull manipulation region generation unit 19, for example.

With the above measure, when the user needs to make a special manipulation in using any of various functions, he or she can have a Z coordinate detection region generated by touching the functional region. This makes it possible to efficiently utilize the touch panel area which is limited in size.

Furthermore, the control unit generates a Z coordinate detection region in the input detection surface when contact to the functional region that has lasted for a prescribed time or longer is detected by the input detection unit.

With the above measure, a Z coordinate detection region is not generated when the user touches the functional region only for a short time. Thus, an erroneous operation due to such unintended contact can be prevented.

For example, where a pull manipulation region is generated in the vicinity of a contact position, the drag movement distance is made short. Therefore, a pull manipulation can be started with a short drag movement distance from the contact position.

Furthermore, for example, since it is not necessary to set a pull manipulation region on the touch panel in a fixed manner, the screen can be utilized efficiently.

(Embodiment 4)

Figure 16:
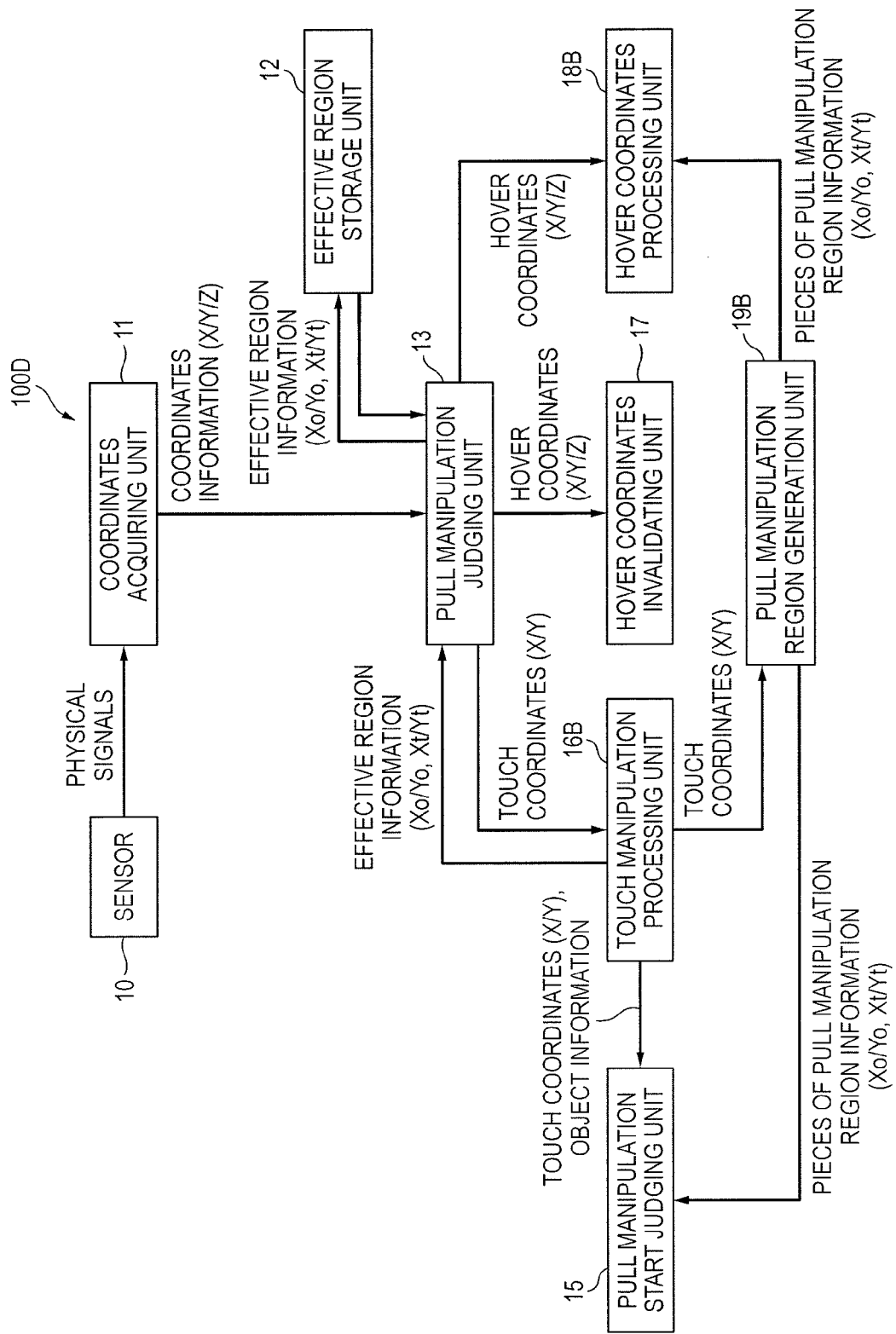
FIG. 16 is a block diagram showing an example configuration of an input device according to a fourth embodiment of the invention.

FIG. 16 is a block diagram showing an example configuration of an input device according to a fourth embodiment of the invention. Constituent elements in FIG. 16 having equivalent ones in the input device according the above-described embodiment are given the same reference symbols as the latter.

As shown in FIG. 16, the input device 100D is equipped with a sensor 10, a coordinates acquiring unit 11, an effective region storage unit 12, a pull manipulation judging unit 13, a pull manipulation start judging unit 15, a touch manipulation processing unit 16B, a hover coordinates invalidating unit 17, a hover manipulation processing unit 18B, and a pull manipulation region generation unit 19B.

That is, the input device 100D is equipped with the touch manipulation processing unit 16B, the hover manipulation processing unit 18B, and the pull manipulation region generation unit 19B in place of the touch manipulation processing unit 16, the hover manipulation processing unit 18, and the pull manipulation region generation unit 19, respectively. Descriptions of the other elements will be omitted because they are equivalent to the corresponding ones of the input device according to the above-described embodiment.

The pull manipulation region generation unit 19B generates a pull manipulation region in response to a user input manipulation. For example, the pull manipulation region generation unit 19B receives touch coordinates (X/Y) from the touch manipulation processing unit 16B, and generates one or more pull manipulation regions having prescribed sizes at prescribed positions when a particular object on the touch panel has been pushed for a long time.

The pull manipulation region generation unit 19B also functions as the pull manipulation regions storage unit 14. That is, the pull manipulation region generation unit 19B holds information of each of the generated pull manipulation regions.

The pull manipulation region generation unit 19B outputs the information (Xo/No, Xt/Yt) of the generated pull manipulation region is input to the pull manipulation start judging unit 15 and the hover manipulation processing unit 18B.

The hover manipulation processing unit 18B performs prescribed processing corresponding to a hover manipulation on the basis of hover coordinates (X/Y/Z) that are output from the pull manipulation judging unit 13. At this time, the hover manipulation processing unit 18B performs processing that is assigned to an effective region.

Next, a description will be made of how to manipulate an application in the input device 100D.

Figure 17:
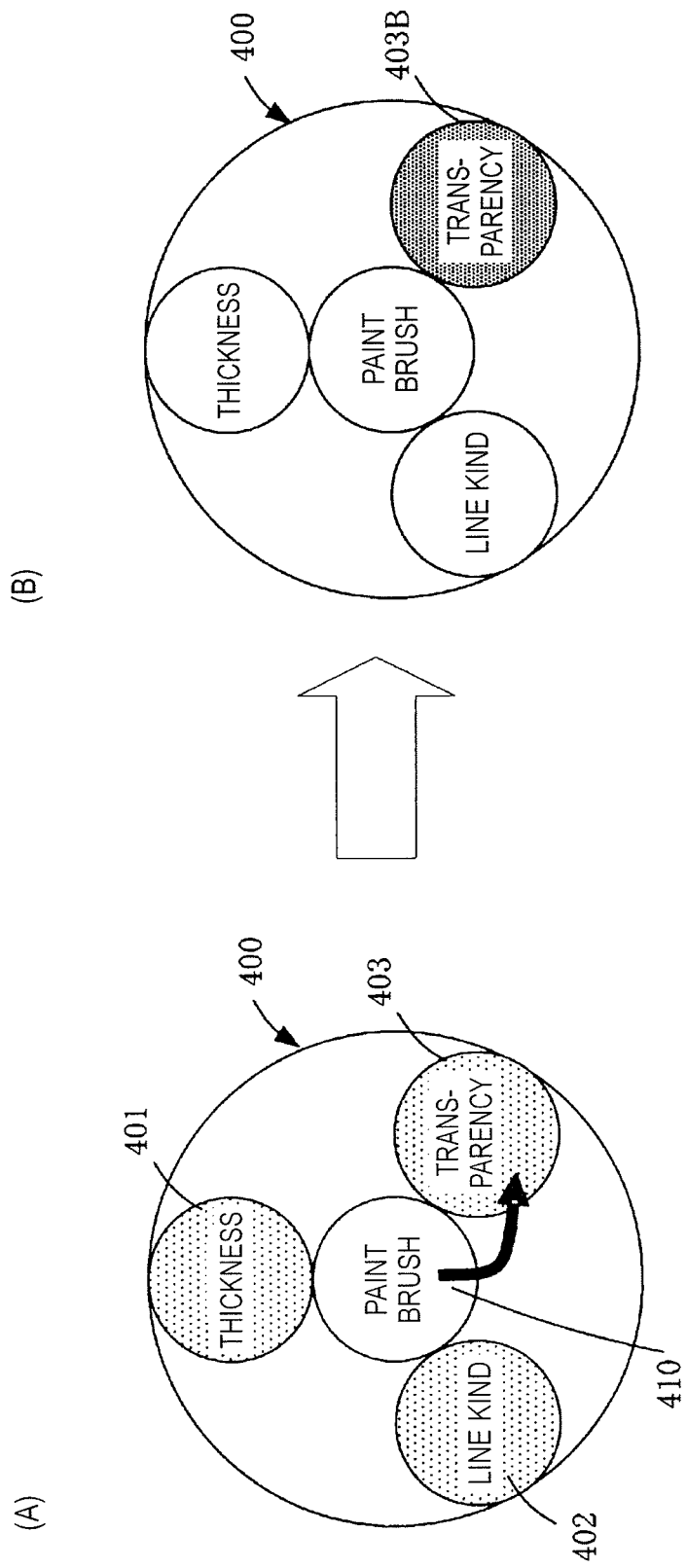
FIGS. 17(A) and 17(B) illustrate a state transition of an example manipulation made for a specific application in the input device according to the fourth embodiment of the invention.

FIGS. 17(A) and 17(B) illustrate a state transition of an example manipulation made for a specific application in the input device 100D.

The example of FIGS. 17(A) and 17(B) assumes a case that the input device 100D runs a painting software application having functions for drawing and figure edition. As shown in FIGS. 17(A) and 17(B), a manipulation region 400 of the application on the touch panel contains a tool region 410 that is assigned an object having a "paint brush" function and pull manipulation regions 401, 402, and 403.

Information indicating the range of each of the pull manipulation regions 401, 402, and 403 shown in FIGS. 17(A) and 17(B) is generated by the pull manipulation region generation unit 19B when the tool region having the "paint brush" function has been pushed for a long time. Parameters "thickness," "line kind," and "transparency" are assigned to the respective pull manipulation regions 401, 402, and 403.

The object of the tool region 410 can be dragged by the user. The example of FIG. 17(A) assumes that the user selects the object corresponding to the tool region 410 by touching the tool region 410 with a finger and drags the touched object into the range of the generated pull manipulation region 403.

When the user drags the touched object into the range of the pull manipulation region 403 and releases the finger, the pull manipulation start judging unit 15 judges that processing corresponding to a pull manipulation should be started.

The hover manipulation processing unit 18B recognizes that among the pull manipulation regions 401, 402, and 403 the pull manipulation region 403 is an effective region by referring to effective region information and hover coordinates that are output from the pull manipulation judging unit 13.

As a result, a transition is made from the state of FIG. 17(A) to a state of FIG. 17(B). At this time, to clearly show that the pull manipulation region 403 to which the dragged object has come to belong is a pull-manipulable, effective region, the hover manipulation processing unit 18B may change the manner of display (e.g., display color) of the pull manipulation region 403 (denoted by another symbol 403B).

FIG. 17(B) assumes that a pull manipulation is being made. In the state of FIG. 17(B), the hover manipulation processing unit 18B performs processing in accordance with the finger position. More specifically, the parameter of the "paint brush" object (manipulation target) is varied as the Z coordinate of the user finger which is located in the range of the pull manipulation region 403B (effective region) is varied. In the example of FIG. 17(B), since the "transparency" parameter is assigned to the pull manipulation region 403B, the "transparency" parameter of the "paint brush" object is varied.

The processing corresponding to the pull manipulation is finished as soon as the user finger position goes out of the pull manipulation region 403B.

Likewise, if the object corresponding to the tool region 410 is dragged to the pull manipulation region 401, a pull manipulation for varying the "thickness" parameter of the "paint brush" object which corresponds to the tool region 410 is enabled.

If the object corresponding to the tool region 410 is dragged to the pull manipulation region 402, a pull manipulation for varying the "line kind" parameter of the "paint brush" object which corresponds to the tool region 410 is enabled.

Next, a description will be made of an example process of the input device 100D.

In the following, a description will be made of how the hover manipulation processing unit 18B operates. The other constituent elements operate in the same manners as described above with reference to FIG. 7, 11, or 15.

Figure 18:
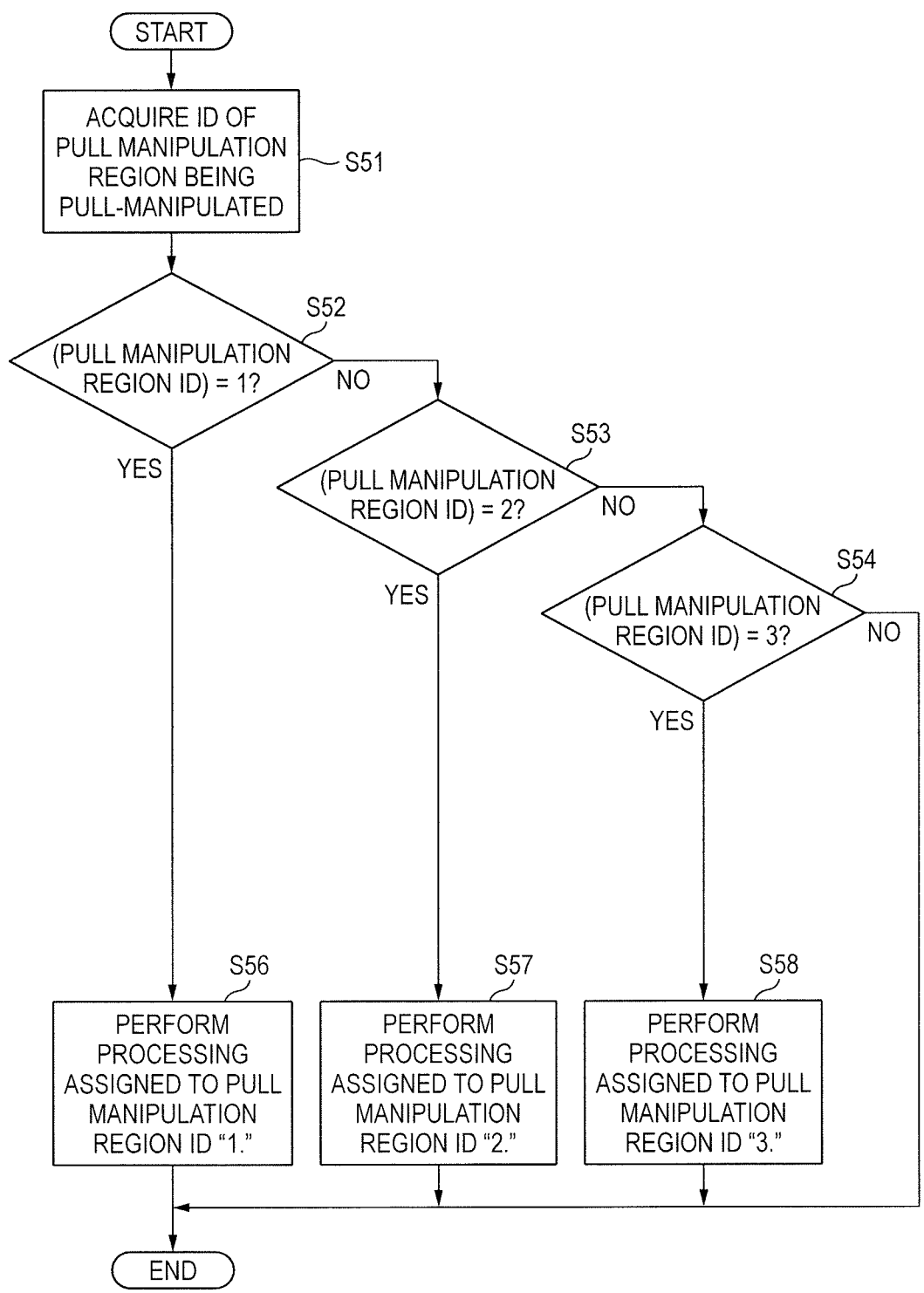
FIG. 18 is a flowchart showing an example essential process of the input device according to the fourth embodiment of the invention.

FIG. 18 is a flowchart showing an example essential process of the input device 100D. The process of FIG. 18 corresponds to, for example, step S22 in FIG. 7.

At step S51, the hover manipulation processing unit 18B receives information of an effective region (e.g., the pull manipulation region 403 shown in FIG. 17(A)) from the pull manipulation judging unit 13 and acquires an ID (see FIGS. 2 and 3) for identification of this region.

At steps S52-S54, the hover manipulation processing unit 18B compares the acquired ID of the pull manipulation region with "1," "2," and "3," respectively. If it is judged at step S52 that the ID of the pull manipulation region coincides with "1," the process moves to step S56. If it is judged at step S53 that the ID of the pull manipulation region coincides with "2," the process moves to step S57. If it is judged at step S54 that the ID of the pull manipulation region coincides with "3," the process moves to step S58.

At step S56, the hover manipulation processing unit 18B performs processing that is assigned in advance to the pull manipulation region ID "1." For example, if the pull manipulation region ID "1" corresponds to the pull manipulation region 401 shown in FIG. 17(A), the hover manipulation processing unit 18B performs pull manipulation processing for varying the "thickness" parameter of the object being manipulated.

At step S57, the hover manipulation processing unit 18B performs processing that is assigned in advance to the pull manipulation region ID "2." For example, if the pull manipulation region ID "2" corresponds to the pull manipulation region 402 shown in FIG. 17(A), the hover manipulation processing unit 18B performs pull manipulation processing for varying the "line kind" parameter of the object being manipulated.

At step S58, the hover manipulation processing unit 18B performs processing that is assigned in advance to the pull manipulation region ID "3." For example, if the pull manipulation region ID "3" corresponds to the pull manipulation region 403 shown in FIG. 17(A), the hover manipulation processing unit 18B performs pull manipulation processing for varying the "transparency" parameter of the object being manipulated.

As described above, in the input device 100C, the input detection surface has a functional region which is assigned a prescribed function and Z coordinate detection regions that are assigned respective prescribed parameter types of the function. For example, the parameter types are "thickness," "line kind," and "transparency." The control unit controls a parameter of the parameter type assigned to the drag destination Z coordinate detection region of the function that is assigned to the functional region on the basis of a Z coordinate of input coordinates that have been detected by the coordinates detection unit after an input indicating that the functional region has been dragged to a Z coordinate detection region is detected by the input detection unit. The control unit is the hover manipulation processing unit 18B, for example.

With this measure, the user can select, with a simple drag manipulation, a function as a target of parameter change and a parameter to be changed and can change the parameter by adjusting the finger height in the Z-axis direction. Furthermore, it becomes possible to easily use, for each purpose, an appropriate one of plural kinds of parameters of the function assigned to one object.

Although this embodiment is directed to the case that the pull manipulation region generation unit 19 generates the pull manipulation regions 401-403, they may be generated in advance and displayed on the screen.

(Embodiment 5)

Figure 19:
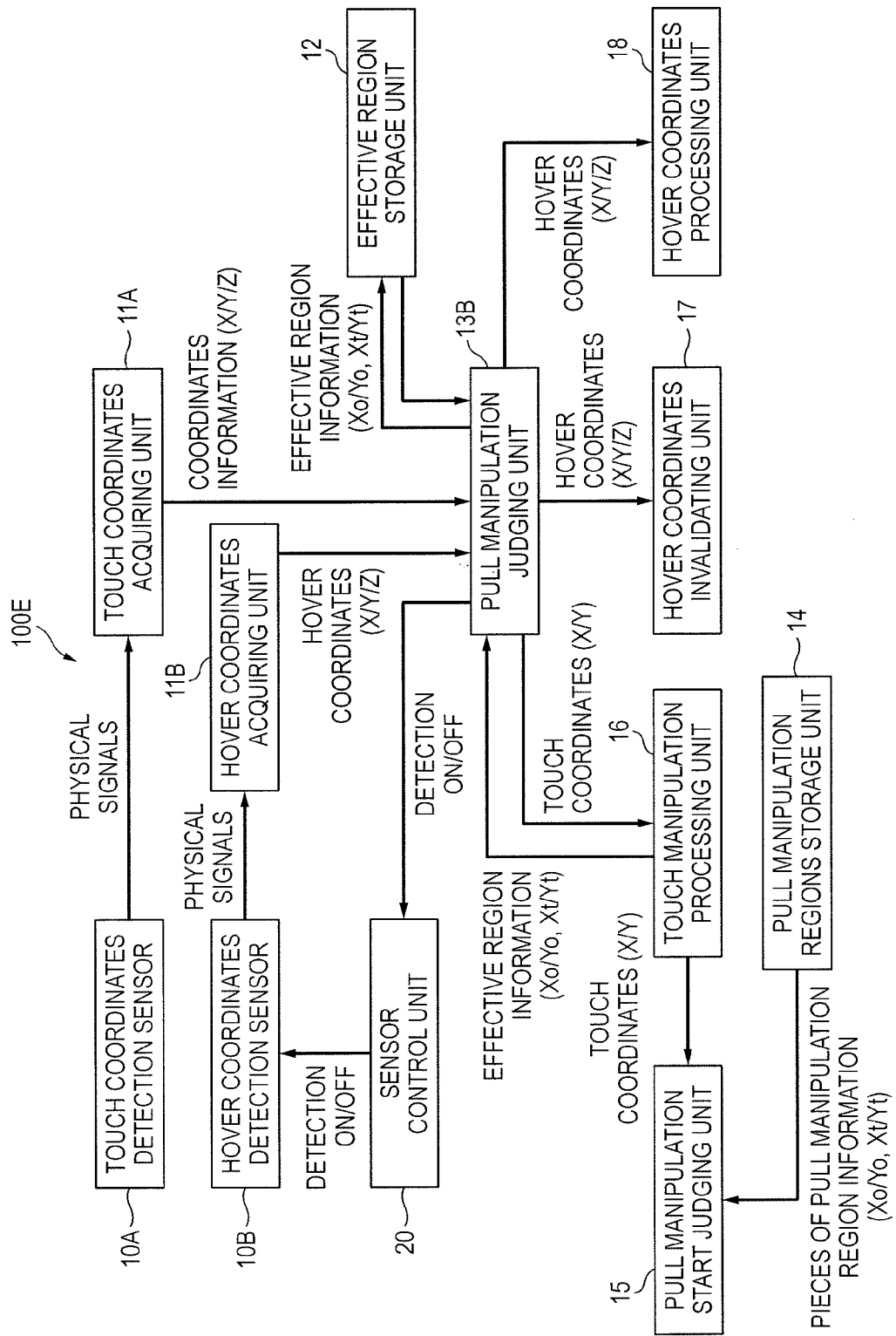
FIG. 19 is a block diagram showing an example configuration of an input device according to a fifth embodiment of the invention.

FIG. 19 is a block diagram showing an example configuration of an input device according to a fifth embodiment of the invention. Constituent elements in FIG. 19 having equivalent ones in the input device according the above-described embodiment are given the same reference symbols as the latter.

As shown in FIG. 19, the input device 100E is equipped with a touch coordinates detection sensor 10A, a hover coordinates detection sensor 10B, a touch coordinates acquiring unit 11A, a hover coordinates acquiring unit 11B, an effective region storage unit 12, a pull manipulation judging unit 13B, a pull manipulation regions storage unit 14, a pull manipulation start judging unit 15, a touch manipulation processing unit 16, a hover coordinates invalidating unit 17, a hover manipulation processing unit 18, and a sensor control unit 20.

That is, in the input device 100E, the touch coordinates detection sensor 10A and the hover coordinates detection sensor 10B are provided place of the sensor 10. The touch coordinates acquiring unit 11A and the hover coordinates acquiring unit 11B are provided place of the coordinates acquiring unit 11. The pull manipulation judging unit 13B is provided place of the pull manipulation judging unit 13. Furthermore, the input device 100E is added with the sensor control unit 20. Descriptions of the other elements will be omitted because they are equivalent to the corresponding ones of the input device according to the above-described embodiment.

The touch coordinates detection sensor 10A and the hover coordinates detection sensor 10B detect position coordinates of a user finger or the like in a manipulable range on the touch panel of the input device 100E. The touch coordinates detection sensor 10A and the hover coordinates detection sensor 10B can detect an input to the same region in such a manner that it is correlated with the same coordinates.

The touch coordinates detection sensor 10A is a sensor of a general two-dimensional touch panel and serves for detection of only touch coordinates (X/Y). The touch coordinates detection sensor 10A detects occurrence of a touch on the basis of the intensity of a signal detected by the sensor. The touch coordinates detection sensor 10A can be implemented using the same techniques as general touch panels are.

The hover coordinates detection sensor 10B is a sensor of a three-dimensional touch panel and serves for detection of hover coordinates (X/Y/Z).

The touch coordinates acquiring unit 11A acquires information representing touch coordinates (X/Y) on the basis of physical signals (e.g., electrical signals) that are output from the touch coordinates detection sensor 10A. For example, the touch coordinates acquiring unit 11A acquires an X coordinate and a Y coordinate on the basis of a position where an object has been detected by the touch coordinates detection sensor 10A.

The hover coordinates acquiring unit 11B acquires information representing hover coordinates (X/Y/Z) on the basis of physical signals that are output from the hover coordinates detection sensor 10B. For example, the hover coordinates acquiring unit 11B acquires an X coordinate and a Y coordinate on the basis of a position where an object has been detected by the hover coordinates detection sensor 10B. Furthermore, the hover coordinates acquiring unit 11B detects a Z coordinate on the basis of the intensity of a detection signal (it is assumed here that its intensity increases as an object becomes close to the touch panel).

The sensor control unit 20 on/off-switches a detection operation of the hover coordinates detection sensor 10B on the basis of an output of the pull manipulation judging unit 13B.

The pull manipulation judging unit 13B performs judgment processing relating to a pull manipulation on the basis of touch coordinates (including occurrence/non-occurrence of a touch) that are output from the touch coordinates acquiring unit 11A, hover coordinates that are output from the hover coordinates acquiring unit 11B, and information indicating a pull manipulation region. Furthermore, the pull manipulation judging unit 13B judges whether hover coordinates are necessary or not and gives the sensor control unit 20 a signal for on/off-controlling a detection operation of the hover coordinates detection sensor 10B, on the basis of a judgment result.

Next, a description will be made of specific examples of the hover coordinates detection sensor 10B.

Figure 20:
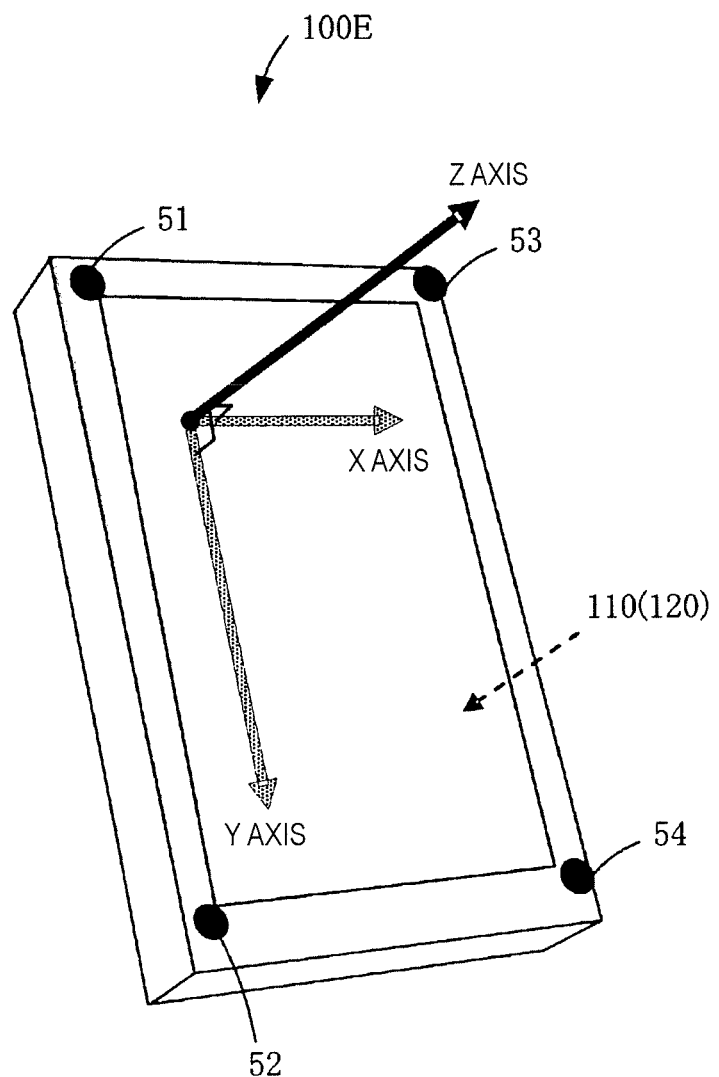
FIG. 20 illustrates a first example hover coordinates detection sensor which can be employed in the input device according to the fifth embodiment of the invention.

FIG. 20 illustrates a first specific example of the hover coordinates detection sensor 10B.

In the example of FIG. 20, ultrasonic sensors 51, 52, 53, and 54 are arranged in the vicinities of the four corners of a rectangular touch panel 120 of the input device 100E. Each of the four ultrasonic sensors 51-54 is composed of an ultrasonic transmitter and receiver.

Each of the ultrasonic sensors 51-54 transmits ultrasonic waves toward an object such as a user finger that is in contact with or close to the touch panel 120 and receives ultrasonic waves reflected from the object. A control unit (not shown) detects times between transmissions and receptions of ultrasonic waves and differences between the reception times of the respective ultrasonic sensors 51-54, and thereby detects a Z coordinate and X and Y coordinates of the object.

As such, the ultrasonic sensors 51-54 have the function of the hover coordinates detection sensor 10B.

Figure 21:
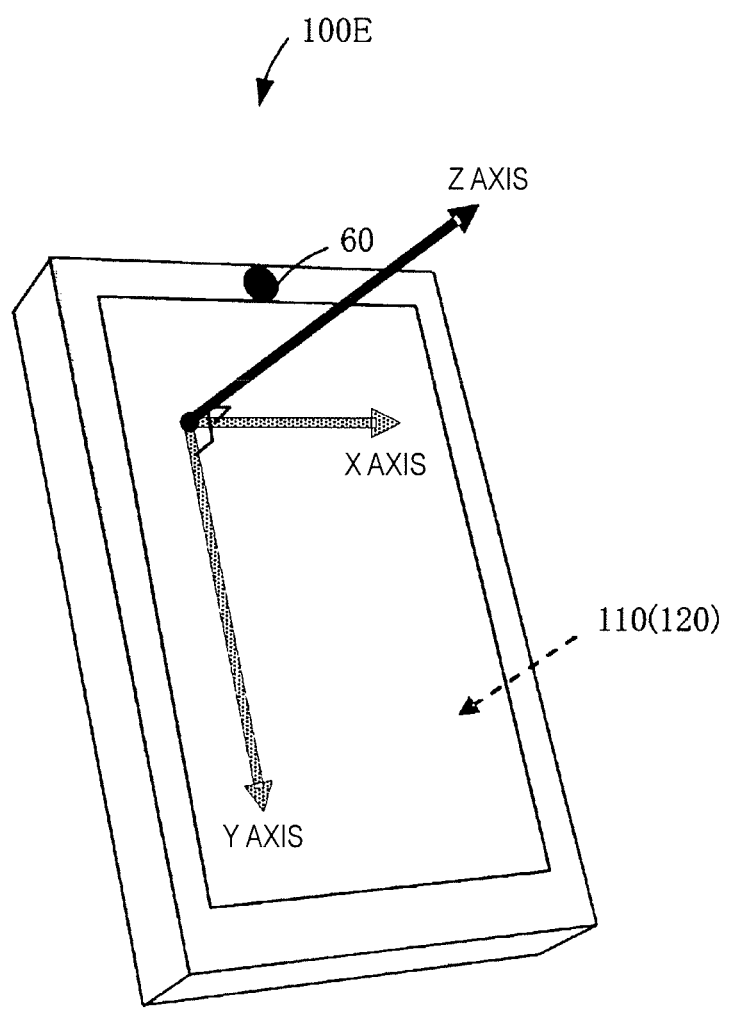
FIG. 21 illustrates a second example hover coordinates detection sensor which can be employed in the input device according to the fifth embodiment of the invention.

FIG. 21 illustrates a second specific example of the hover coordinates detection sensor 10B.

In the example of FIG. 21, a camera 60 capable of shooting in the Z-axis direction is provided on the body of the input device 100E. The camera 60 repeatedly shoots a subject including an object such as a user finger that is in contact with or close to the touch panel 120. A control unit (not shown) analyzes images obtained by the shooting operations and thereby a Z coordinate and X and Y coordinates of the object.

As such, the camera 60 has the function of the hover coordinates detection sensor 10B. The accuracy of position detection can be increased by setting plural cameras 60.

Next, a description will be made of how the input device 100E operates.

Figure 22:
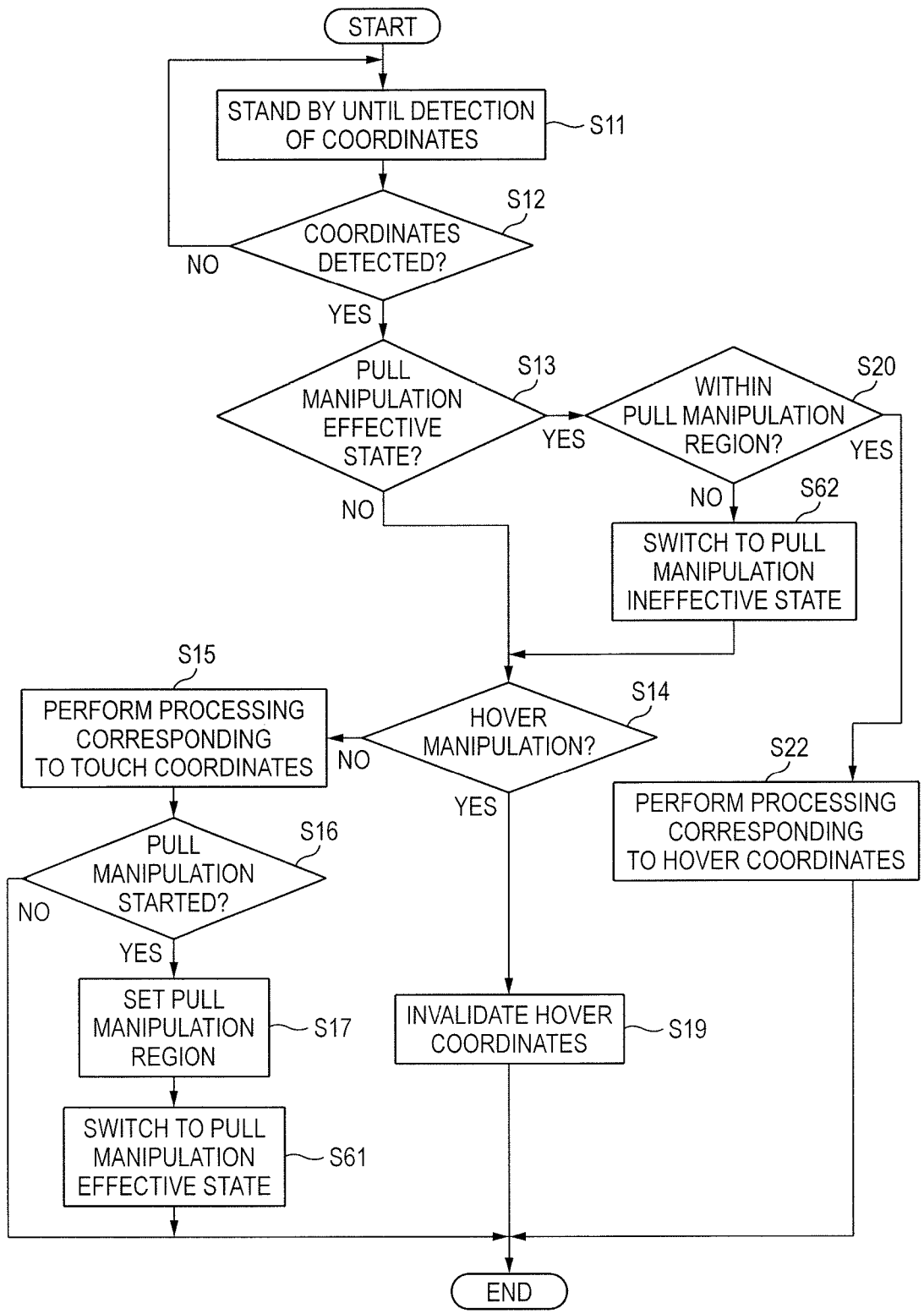
FIG. 22 is a flowchart showing an example essential process of the input device according to the fifth embodiment of the invention.

FIG. 22 is a flowchart showing an example essential process of the input device 100E. Whereas a large part of the process of the input device 100E shown in FIG. 22 is the same as the corresponding part of the process of the input device 100 shown in FIG. 7, steps S61 and S62 are different from the corresponding steps of the latter and will be described below. It is assumed that the hover coordinates detection sensor 10B is off at the initial state.

When the process relating to a pull manipulation has been started, as in the first embodiment, the pull manipulation start judging unit 15 detects a start of a pull manipulation (step S16) and the pull manipulation judging unit 13B stores effective region information indicating an effective pull manipulation region in the effective region storage unit 12 (step S17).

At step S61, the pull manipulation judging unit 13B switches from a pull manipulation ineffective state to a pull manipulation effective state. Furthermore, the pull manipulation judging unit 13B instructs the sensor control unit 20 to turn on detection by the hover coordinates detection sensor 10B. In response to this instruction, the sensor control unit 20 controls the hover coordinates detection sensor 10B so that it starts an operation of detecting hover coordinates.

On the other hand, if finger position coordinates that are outside the effective manipulation region are detected after the start of the pull manipulation, the process moves to step S62 via steps S13 and S20 (see FIG. 22).

At step S62, since the finger has moved to the outside of the effective manipulation region, the pull manipulation judging unit 13B switches from the pull manipulation effective state to a pull manipulation ineffective state. Furthermore, the pull manipulation judging unit 13B instructs the sensor control unit 20 to turn off the detection by the hover coordinates detection sensor 10B. In response to this instruction, the sensor control unit 20 controls the hover coordinates detection sensor 10B so that it finishes the operation of detecting hover coordinates.

The power consumption relating to the hover coordinates detection sensor 10B can be suppressed by suspending the detection operation of the hover coordinates detection sensor 10B.

As described above, in the input device 100E, the coordinates detection unit has a first coordinates detection unit which detects an X coordinate and a Y coordinate which are coordinates in directions parallel with the input detection surface and a second coordinates detection unit which detects a Z coordinate. The first coordinates detection unit is the touch coordinates acquiring unit 11A, for example. The second coordinates detection unit is the hover coordinates acquiring unit 11B, for example. The control unit causes the second coordinates detection unit to start detection of a Z coordinate after detection, by the input detection unit, of contact to the input detection surface of the input detection unit. The control unit is the sensor control unit 20, for example.

With this measure, when it is not necessary to detect a Z coordinate, the power consumption can be suppressed by suspending the operation of the hover coordinates detection sensor 10B.

Furthermore, the detection performance (the accuracy of coordinates and the height of the proximity detection region) can be improved by using sensors that are most suitable for the detection of touch coordinates and detection of hover coordinates, respectively. Still further, power saving can be attained by restricting the detection hover coordinates to a minimum necessary extent.

The configuration of the input device 100E shown in FIG. 19 assumes the case that the hover coordinates detection sensor 10B detects coordinates in the three axes, that is, the X, Y, and Z axes. Instead, corresponding outputs of the touch coordinates sensor 10A may be used as X and Y coordinates. Therefore, a sensor capable of detecting only a position in the Z-axis direction can be used as the hover coordinates detection sensor 10B.

The technique of the fifth embodiment can be applied to each of the first to fourth embodiments. That is, each of the first to fourth embodiments may be modified so as to be equipped with the touch coordinates sensor 10A and the hover coordinates detection sensor 10B and added with the function of on/off-switching the detection operation of the hover coordinates detection sensor 10B.

In each of the first to fifth embodiments, pull manipulations may be made at plural locations simultaneously. Furthermore, plural pull manipulation effective regions may be set.

The invention is not limited to the configurations of the above embodiments, and may have any configuration as long as functions described in the claims or provided by the configuration of any of the embodiments can be realized.

Although each of the above embodiments mainly assumes the case of manipulating the touch panel with a finger, the touch panel may be manipulated using another object.

Although the invention has been described in detail by referring to the particular embodiments, it is apparent to those skilled in the art that various changes and modifications are possible without departing from the spirit and scope of the invention.

The present application is based on Japanese Patent Application No. 2012-020005 filed on Feb. 1, 2012, the contents of which are incorporated herein by reference.

DESCRIPTION OF SYMBOLS

10: Sensor
10A: Touch coordinates sensor
10B: Hover coordinates detection sensor
11: Coordinates acquiring unit
11A: Touch coordinates acquiring unit
11B: Hover coordinates acquiring unit
12: Effective region storage unit
13, 13B: Pull manipulation judging unit
14: Pull manipulation regions storage unit
15, 15B: Pull manipulation start judging unit
16, 16B: Touch manipulation processing unit
17: Hover coordinates invalidating unit
18, 18B: Hover manipulation processing unit
19, 19B: Pull manipulation region(s) generation unit
20: Sensor control unit
51-54: Ultrasonic sensors
60: Camera
100, 100B, 100C, 100D, 100E: Input device
110: Display unit
120: Touch panel
130, 131: Index manipulation region
130a: "あ row" region
131a: "abc" region
200, 300, 400: Application manipulation region
201-208, 410: Tool region(s)
210, 310, 401, 402, 403: Pull manipulation region
301-303: Folder regions
320: Preview region
A1, A2, A3: Region
F: User finger
P11, P12, P13, P14, P15: Position
TB1, TB1B: Region table
TP1: Manipulation surface of touch panel

The invention claimed is:

1. An input device, comprising:
an input detector that detects an input;
a coordinates detector that detects input coordinates that are coordinates of the input detected by the input detector; and
a controller that, when an input to an input detection surface which is a surface on which the input detector is placed is detected, makes effective a Z coordinate that is in a direction perpendicular to the input detection surface among the input coordinates detected by the coordinates detector, wherein the controller sets, in the input detection surface, a Z coordinate detection region in which to detect a Z coordinate, and makes effective a Z coordinate among input coordinates of an input to the Z coordinate detection region after contact to the Z coordinate detection region is detected by the input detector.

2. The input device according to claim 1, wherein the controller starts recognition of a Z coordinate among input coordinates of an input to the Z coordinate detection region after contact to the Z coordinate detection region that has lasted a prescribed time or longer is detected by the input detector.

3. The input device according to claim 1, wherein the controller varies a parameter of a prescribed function that is assigned to the Z coordinate detection region on the basis of a Z coordinate of input coordinates that have been detected by the coordinates detector after contact to the Z coordinate detection region is detected by the input detector.

4. The input device according to claim 1, wherein the input detection surface has the Z coordinate detection region and functional regions that are assigned respective prescribed functions; and
wherein the controller controls a parameter of a function that is assigned to the dragged functional region on the basis of a Z coordinate of input coordinates that have been detected by the coordinates detector after an input indicating that a functional region has been dragged to the Z coordinate detection region is detected by the input detector.

5. The input device according to claim 1, wherein the input detection surface has a functional region that is assigned a prescribed function and Z coordinate detection regions that are assigned respective prescribed parameter types of the function; and
wherein the controller controls a parameter of the parameter type assigned to the drag destination Z coordinate detection region of the function that is assigned to the functional region on the basis of a Z coordinate of input coordinates that have been detected by the coordinates detector after an input indicating that the functional region has been dragged to a Z coordinate detection region is detected by the input detector.

6. The input device according to claim 1, wherein the input detection surface has a functional region that is assigned a prescribed function; and
wherein the controller generates a Z coordinate detection region in the input detection surface when contact to the functional region is detected.

7. The input device according to claim 6, wherein the input detection surface has a functional region which is assigned a prescribed function; and
wherein the controller generates a Z coordinate detection region in the input detection surface when contact to the functional region that has lasted for a prescribed time or longer is detected by the input detector.

8. The input device according to claim 1, wherein the coordinates detector comprises a first coordinates detector for detecting an X coordinate and a Y coordinate, which are coordinates in directions parallel with the input detection surface, and a second coordinates detector for detecting at least a Z coordinate; and
wherein the controller causes the second coordinates detector to start detection of a Z coordinate after detection, by the input detector, of contact to the input detection surface of the input detector.

9. An input device, comprising:
an input detector that detects an input;
a coordinates detector that detects input coordinates that are coordinates of the input detected by the input detector; and
a controller that, when an input to an input detection surface which is a surface on which the input detector is placed is detected, makes effective a Z coordinate that is in a direction perpendicular to the input detection surface among the input coordinates detected by the coordinates detector,
wherein the controller invalidates the input coordinates detected by the coordinates detector until contact to the input detection surface is detected by the input detector.

10. An input device, comprising:
an input detector that detects an input;
a coordinates detector that detects input coordinates that are coordinates of the input detected by the input detector; and
a controller that, when an input to an input detection surface which is a surface on which the input detector is placed is detected, makes effective a Z coordinate that is in a direction perpendicular to the input detection surface among the input coordinates detected by the coordinates detector,
wherein the controller suspends the detection of input coordinates by the input coordinates until contact to the input detection surface is detected by the input detector.

11. An input control method, comprising:
detecting input coordinates that are coordinates of an input detected by an input detector for detecting an input; and
when an input to an input detection surface, which is a surface on which the input detector is placed, is detected, making effective a Z coordinate that is in a direction perpendicular to the input detection surface among the detected input coordinates,
wherein a controller sets, in an input detection surface, a Z coordinate detection region in which to detect a Z coordinate, and makes effective a Z coordinate among input coordinates of an input to the Z coordinate detection region after contact to the Z coordinate detection region is detected by the input detector.

12. A non-transitory computer-readable storage medium, which includes an input control program that causes a computer to execute the input control method, according to claim 11.

* * * * *